United States Patent
Tada

(10) Patent No.: US 10,533,786 B2
(45) Date of Patent: Jan. 14, 2020

(54) REFRIGERATING CYCLE APPARATUS

(71) Applicant: DENSO CORPORATION, Kariya, Aichi-pref. (JP)

(72) Inventor: Kazuhiro Tada, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 114 days.

(21) Appl. No.: 15/823,758

(22) Filed: Nov. 28, 2017

(65) Prior Publication Data
US 2018/0156509 A1    Jun. 7, 2018

(30) Foreign Application Priority Data
Dec. 1, 2016    (JP) .................................. 2016-234171

(51) Int. Cl.
| | |
|---|---|
| F25B 47/02 | (2006.01) |
| F25B 41/00 | (2006.01) |
| F25B 41/06 | (2006.01) |
| F25B 41/04 | (2006.01) |

(52) U.S. Cl.
CPC ............ *F25B 47/02* (2013.01); *F25B 41/003* (2013.01); *F25B 41/043* (2013.01); *F25B 41/062* (2013.01); *F25B 2347/02* (2013.01)

(58) Field of Classification Search
CPC .......................... F25B 47/02; F25B 2347/021; F25B 2347/23; F25B 47/022; B60H 2001/00961; F24F 11/42
See application file for complete search history.

(56) References Cited

U.S. PATENT DOCUMENTS

| | | | | |
|---|---|---|---|---|
| 5,845,502 A | * | 12/1998 | Chen .................... | F25B 47/006 62/81 |
| 6,047,554 A | * | 4/2000 | Choi .................... | F25D 21/006 62/154 |
| 6,487,869 B1 | * | 12/2002 | Sulc .................... | B60H 1/3205 62/228.4 |
| 2009/0126399 A1 | * | 5/2009 | Takegami ............... | F25B 13/00 62/510 |
| 2010/0218528 A1 | * | 9/2010 | Yakumaru ............. | F25B 47/022 62/234 |

(Continued)

FOREIGN PATENT DOCUMENTS

| | | | |
|---|---|---|---|
| CN | 105995386 A | * | 10/2016 |
| JP | S61-262560 A | | 11/1986 |

(Continued)

*Primary Examiner* — Nelson J Nieves
(74) *Attorney, Agent, or Firm* — Harness, Dickey & Pierce, P.L.C.

(57) ABSTRACT

A refrigerating cycle apparatus includes: a compressor that compresses and discharges refrigerant; a radiator that makes the refrigerant discharged out of the compressor to radiate heat; a pressure reducing device that decompresses the refrigerant flowing out of the radiator; an evaporator that evaporates the refrigerant decompressed by the pressure reducing device; and a decompression control part that controls operation of the pressure reducing device. The decompression control part controls the operation of the pressure reducing device in a manner that a physical quantity which has correlation with a pressure of the refrigerant in the evaporator approaches a predetermined defrosting standard value when a time-priority defrosting mode is set.

4 Claims, 8 Drawing Sheets

(56) References Cited

U.S. PATENT DOCUMENTS

| | | | |
|---|---|---|---|
| 2012/0085117 A1* | 4/2012 | Ikemiya | B60H 1/3232 62/277 |
| 2012/0111042 A1* | 5/2012 | Hamada | F25B 47/025 62/157 |
| 2013/0305759 A1* | 11/2013 | Tsunoda | F25D 21/004 62/151 |
| 2015/0283978 A1* | 10/2015 | Miyakoshi | F25B 47/022 62/140 |
| 2015/0300723 A1* | 10/2015 | Tsukino | F25B 47/025 62/128 |
| 2016/0016459 A1* | 1/2016 | Hamamoto | B60H 1/00921 62/160 |
| 2016/0082810 A1* | 3/2016 | Suzuki | B60H 1/00921 62/151 |
| 2016/0153697 A1* | 6/2016 | Hamamoto | B60H 1/00921 62/140 |
| 2016/0169571 A1* | 6/2016 | Kimura | F25B 47/025 62/155 |
| 2016/0178259 A1* | 6/2016 | Kimura | F25B 47/025 62/155 |
| 2016/0223236 A1* | 8/2016 | Kimura | F24F 3/065 |
| 2016/0238297 A1 | 8/2016 | Nuno et al. | |
| 2016/0370045 A1* | 12/2016 | Takenaka | F25B 47/02 |
| 2016/0370095 A1* | 12/2016 | Jung | F25D 21/006 |
| 2017/0210202 A1* | 7/2017 | Suzuki | F25B 5/04 |
| 2018/0187936 A1* | 7/2018 | Najima | F24F 11/65 |
| 2018/0238598 A1* | 8/2018 | Xu | F25B 49/02 |
| 2018/0266743 A1* | 9/2018 | Watanabe | F25B 47/02 |
| 2019/0063793 A1* | 2/2019 | Tang | F25B 13/00 |

FOREIGN PATENT DOCUMENTS

| | | |
|---|---|---|
| JP | H07-012437 A | 1/1995 |
| JP | 2011-153789 A | 8/2011 |
| JP | 2011-247547 A | 12/2011 |
| JP | 2015-033953 A | 2/2015 |
| JP | 2015-068567 A | 4/2015 |
| JP | 2015-068570 A | 4/2015 |

\* cited by examiner

FIG. 7

| | COOLING MODE | DEHUMIDIFICATION HEATING MODE | HEATING MODE | TIME-PRIORITY DEFROSTING MODE | POWER-SAVING DEFROSTING MODE |
|---|---|---|---|---|---|
| FIRST OPENING-AND-CLOSING VALVE | CLOSE | OPEN | OPEN | OPEN | OPEN |
| SECOND OPENING-AND-CLOSING VALVE | CLOSE | OPEN | CLOSE | CLOSE | CLOSE |
| AIR MIXING DOOR | FULL OPEN | FULL CLOSE | FULL CLOSE | FULL OPEN | FULL OPEN |
| FIRST EXPANSION VALVE | FULL OPEN | OPENING-REDUCED STATE | OPENING-REDUCED STATE | OPENING-REDUCED STATE (CORRESPONDING TO LOW-PRESSURE SIDE PRESSURE) | OPENING-REDUCED STATE (CORRESPONDING TO INTEGRATED ELECTRIC-POWER CONSUMPTION) |
| SECOND EXPANSION VALVE | OPENING-REDUCED STATE | OPENING-REDUCED STATE | FULL CLOSE | FULL CLOSE | FULL CLOSE |
| FAN | ON | ON | ON | OFF | OFF |

US 10,533,786 B2

REFRIGERATING CYCLE APPARATUS

CROSS REFERENCE TO RELATED APPLICATION

This application is based on Japanese Patent Application No. 2016-234171 filed on Dec. 1, 2016, the disclosure of which is incorporated herein by reference in its entirety.

TECHNICAL FIELD

The present disclosure relates to a refrigerating cycle apparatus in which a defrosting operation is performed to a heat exchanger of a refrigerating cycle.

BACKGROUND

Conventionally, a refrigerating cycle apparatus which is applicable to an air-conditioner is developed, and an outdoor heat exchanger of the refrigerating cycle apparatus may be operated as an evaporator. In such a case, when a refrigerant evaporation temperature in the outdoor heat exchanger becomes lower than or equal to the freezing point (0° C.), frost may arise in the outdoor heat exchanger.

If the frost closes a passage of outside air in the outdoor heat exchanger, the heat exchange performance of the outdoor heat exchanger will decrease. That is, the amount of heat absorbed by refrigerant from the outside air in the outdoor heat exchanger will decrease, and air to be sent cannot fully be heated, as a refrigerating cycle.

JP 2015-33953 A describes a refrigerating cycle apparatus in which a defrosting operation is performed for removing frost generated in an outdoor heat exchanger. When the defrosting operation is conducted for the outdoor heat exchanger (evaporator), an opening degree of the expansion valve as a pressure reducing device is increased to a middle position which is set experimentally in advance. Thereby, frost of the outdoor heat exchanger can be melted by hot gas which is refrigerant discharged from the compressor.

SUMMARY

However, in the defrosting operation of the refrigerating cycle apparatus of JP 2015-33953 A, since the opening degree of the expansion valve is merely increased to the middle position which is set experimentally in advance, a difference of the refrigerant between the high pressure side and the low pressure side in a refrigerating cycle easily becomes small depending on the condition, and the amount of heat emitted from the refrigerant in the outdoor heat exchanger also decreases easily. Since the heat emitted from the refrigerant in the outdoor heat exchanger is used for defrosting the outdoor heat exchanger, a period of time taken for completing the defrosting may become long in this case.

It is an object of the present disclosure to provide a refrigerating cycle apparatus in which a defrosting time can be shortened for a defrosting operation of an outdoor heat exchanger.

According to an aspect of the present disclosure, a refrigerating cycle apparatus includes: a compressor that compresses and discharges refrigerant; a radiator that makes the refrigerant discharged out of the compressor to radiate heat; a pressure reducing device that decompresses the refrigerant flowing out of the radiator; an evaporator that evaporates the refrigerant decompressed by the pressure reducing device; and a decompression control part that controls operation of the pressure reducing device. The decompression control part controls the operation of the pressure reducing device in a manner that a physical quantity which has correlation with a pressure of the refrigerant in the evaporator approaches a predetermined defrosting standard value when a time-priority defrosting mode is set.

When defrosting the evaporator in the refrigerating cycle apparatus, enthalpy which can be used for defrosting is securable by controlling the operation of the pressure reducing device in this way, while maintaining the temperature of the evaporator to be more than or equal to a defrosting possible temperature. Thereby, the evaporator of the refrigerating cycle apparatus can be defrosted in the state where the defrosting time is shortened prior to the power-saving.

The predetermined defrosting standard value does not necessarily mean a fixed value. In other words, the controlling is not limited to be performed using a fixed value from the start to the end of the defrosting period. The defrosting standard value may be set suitably based on a predetermined system or contents of the controlling, and may be changed according to transitional operational status using feedback control or feed-forward control.

For example, the defrosting standard value may be corrected to efficiently raise the refrigerant pressure in the evaporator when the defrosting operation is finished, depending on the stage such as immediately after starting the defrosting operation where the refrigerant pressure in the evaporator is low or the final stage of the defrosting operation where the refrigerant pressure in the evaporator is raised.

BRIEF DESCRIPTION OF THE DRAWINGS

The above and other objects, features and advantages of the present disclosure will become more apparent from the following detailed description made with reference to the accompanying drawings. In the drawings:

FIG. 7 is a chart explaining operation states of various air-conditioning components in each operation mode of the first embodiment;

DETAILED DESCRIPTION

Figure 1:
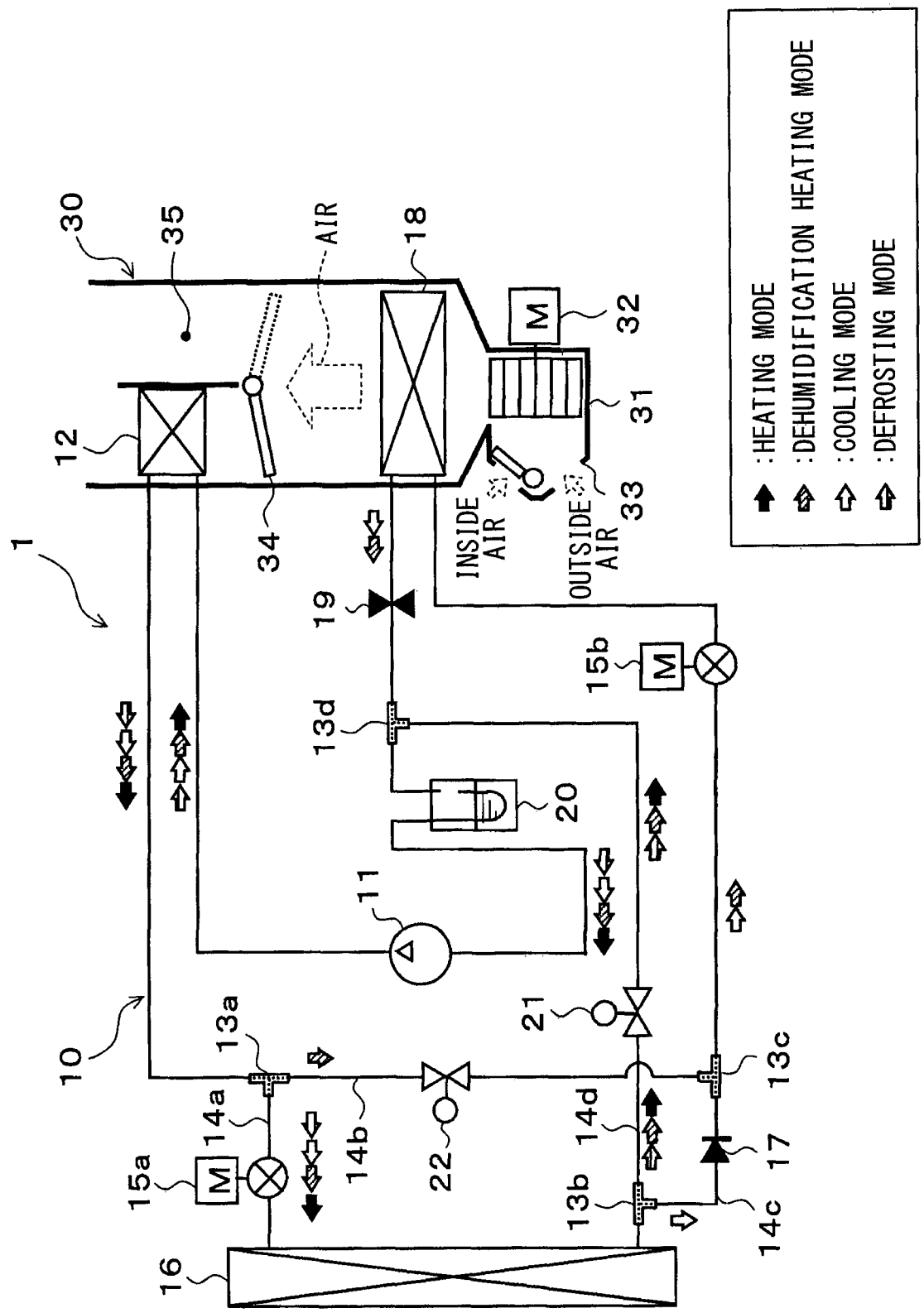
FIG. 1 is a schematic view illustrating an air-conditioner according to a first embodiment.

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

(First Embodiment)

A refrigerating cycle apparatus 10 is applied to an air-conditioner 1 for a vehicle, in a first embodiment, to suitably control temperature in an interior space of the vehicle.

The refrigerating cycle apparatus 10 cools or heats air to be sent to the vehicle interior which is a target space for air-conditioning, in the air-conditioner 1. In other words, air is a target fluid with which heat is exchanged in the first embodiment.

In the refrigerating cycle apparatus 10, the refrigerant circuit is able to be switched among a heating mode, a dehumidification heating mode, a cooling mode, and a defrosting mode. The heating mode is an operation mode in which air is heated and blown off to the vehicle interior. The dehumidification heating mode is an operation mode in which air cooled and dehumidified is re-heated and blown off to the vehicle interior. The cooling mode is an operation mode in which air is cooled and blown off to the vehicle interior. The defrosting mode is an operation mode selected for defrosting a heat exchanger (for example, outdoor heat exchanger 16) of the refrigerating cycle apparatus 10.

In FIG. 1, a black arrow represents a flow of refrigerant in the refrigerant circuit of the heating mode. A slash-hatching arrow represents a flow of refrigerant in the refrigerant circuit of the dehumidification heating mode. A white arrow represents a flow of refrigerant in the refrigerant circuit of the cooling mode. A horizontal-hatching arrow represents a flow of refrigerant in the refrigerant circuit of the defrosting mode.

HFC base refrigerant (such as R134a) is adopted as a refrigerant in the refrigerating cycle apparatus 10, to form a vapor compression subcritical refrigerating cycle, where the high-pressure side refrigerant pressure Pd does not exceed the critical pressure of the refrigerant. As a refrigerant, HFO base refrigerant (for example, R1234yf), or natural refrigerant (for example, R744) may be adopted. Lubricating oil is mixed in the refrigerant to lubricate the compressor 11, and some of the oil circulates through the cycle with the refrigerant.

As shown in FIG. 1, the refrigerating cycle apparatus 10 has the compressor 11, the first expansion valve 15a, the second expansion valve 15b, the outdoor heat exchanger 16, the check valve 17, the indoor evaporator 18, the evaporating pressure regulating valve 19, the accumulator 20, the first opening-and-closing valve 21, and the second opening-and-closing valve 22.

The compressor 11 draws, compresses, and discharges the refrigerant in the refrigerating cycle apparatus 10. The compressor 11 is arranged in the bonnet of the vehicle. The compressor 11 is, for example, an electric compressor in which a fixed capacity type compressor mechanism, in which the discharge capacity is fixed, is driven by an electric motor. Various compressor mechanism such as scrolled type compressor mechanism and a vane type compressor mechanism are employable as the compressor mechanism.

The electric motor of the compressor 11 is controlled in the operation (such as number of rotations) by a control signal outputted from an air-conditioning control device 40. AC motor or DC motor is used as the electric motor. The refrigerant discharge of the compressor mechanism is changed by the air-conditioning control device 40 which controls the number of rotations of the electric motor. The electric motor corresponds to a discharge amount change part of the compressor mechanism.

A refrigerant inlet side of an indoor condenser 12 is connected to the discharge port of the compressor 11. The indoor condenser 12 functions as a heat exchanger for heating at the time of heating mode and dehumidification heating mode. That is, at the time of heating mode and dehumidification heating mode, the indoor condenser 12 heats air by heat exchange between the high temperature and high pressure refrigerant discharged from the compressor 11, and air which passes through the indoor evaporator 18. The indoor condenser 12 is arranged in a casing 31 of the indoor air-conditioning unit 30.

An inflow port of a first three-way joint 13a is connected to the refrigerant outlet of the indoor condenser 12. The first three-way joint 13a functions as a branch part or a unification part in the refrigerating cycle apparatus 10.

For example, at the time of dehumidification heating mode, among the three ports of the first three-way joint 13a, one is used as an inflow port, and the other two are used as outlet ports. The first three-way joint 13a functions as a branch part where the flow of the refrigerant flowing in from one inflow port is branched to flow out from the two outlet ports at the time of dehumidification heating mode. The three-way joint may be formed by joining plural pipes, or formed by providing plural refrigerant passages in a metal block or a resin block.

The refrigerating cycle apparatus 10 further has a second three-way joint 13b, a third three-way joint 13c, and a fourth three-way joint 13d. The fundamental configuration of the three-way joint 13b, 13c, 13d is the same as that of the first three-way joint 13a. For example, two ports are used as inflow ports, and the remaining one is used as an outlet port, in the fourth three-way joint 13d at the time of dehumidification heating mode. The fourth three-way joint 13d functions as a unification part where the refrigerant flowing in from two inflow ports are joined and made to flow out of one outlet port at the time of dehumidification heating mode.

A first refrigerant passage 14a is connected to one outlet port of the first three-way joint 13a. The first refrigerant passage 14a leads the refrigerant which flowed out of the indoor condenser 12 to the refrigerant inlet side of the outdoor heat exchanger 16.

A second refrigerant passage 14b is connected to the other outlet port of the first three-way joint 13a. The second refrigerant passage 14b leads the refrigerant which flowed out of the indoor condenser 12 to the inlet side of the second expansion valve 15b (specifically, to one port of the third three-way joint 13c) arranged in a third refrigerant passage 14c.

The first expansion valve 15a is arranged in the first refrigerant passage 14a. The first expansion valve 15a decompresses the refrigerant which flowed out of the indoor condenser 12 at the time of heating mode, dehumidification heating mode and defrosting mode. The first expansion valve 15a may correspond to a pressure reducing device. The first expansion valve 15a is a variable throttle mechanism having a valve object and an electric actuator. The opening degree of the valve object is changeable, and is controlled by a stepping motor of the electric actuator.

The first expansion valve 15a is a variable throttle mechanism with a full open function. Specifically, when the opening degree of the first expansion valve 15a is made full open, the first expansion valve 15a works as a mere refrigerant passage without a refrigerant decompression action. The operation of the first expansion valve 15a is controlled by a control signal (control pulse) outputted from the air-conditioning control device 40.

The refrigerant inlet side of the outdoor heat exchanger 16 is connected to the outlet side of the first expansion valve 15a, at the front side in the vehicle bonnet. The outdoor heat exchanger 16 carries out heat exchange between the refrigerant which flowed out of the first expansion valve 15a, and outside air sent by a blower (not shown). The blower is an electric blower with which number of rotations (ventilation capability) is controlled by a control voltage outputted from the air-conditioning control device 40.

Specifically at the time of heating mode, the outdoor heat exchanger 16 functions as a heat absorber which absorbs heat from the outside air. At the time of cooling mode and dehumidification heating mode, the outdoor heat exchanger 16 functions as a radiator which radiates heat to the outside air.

One inflow port of the second three-way joint 13b is connected to the refrigerant outlet side of the outdoor heat exchanger 16. The third refrigerant passage 14c is connected to one outlet port of the second three-way joint 13b. The third refrigerant passage 14c leads the refrigerant which flowed out of the outdoor heat exchanger 16 to the refrigerant inlet side of the indoor evaporator 18.

The fourth refrigerant passage 14d is connected to the other outlet port of the second three-way joint 13b. The fourth refrigerant passage 14d leads the refrigerant which flowed out of the outdoor heat exchanger 16 to the inlet side of the accumulator 20 (specifically, one inflow port of the fourth three-way joint 13d).

The check valve 17, the third three-way joint 13c, and the second expansion valve 15b are arranged in this order in the refrigerant flow in the third refrigerant passage 14c. The check valve 17 permits refrigerant to flow only from the second three-way joint 13b to the indoor evaporator 18. The second refrigerant passage 14b is connected to the third three-way joint 13c.

The second expansion valve 15b decompresses the refrigerant which flows out of the outdoor heat exchanger 16 and flows into the indoor evaporator 18. The second expansion valve 15b corresponds to a pressure reducing device. The fundamental configuration of the second expansion valve 15b is the same as that of the first expansion valve 15a. The second expansion valve 15b of this embodiment is a variable throttle mechanism with full closing function. When the opening degree of the second expansion valve 15b is fully closed, this refrigerant passage is closed.

In the refrigerating cycle apparatus 10 of the first embodiment, the refrigerant circuit can be changed by fully closing the second expansion valve 15b to close the third refrigerant passage 14c. In other words, the second expansion valve 15b functions as a refrigerant pressure reducing device and a refrigerant circuit switch device which changes the refrigerant circuit in which the refrigerant circulates.

The indoor evaporator 18 functions as a heat exchanger for cooling at the time of cooling mode and dehumidification heating mode. That is, at the time of cooling mode and dehumidification heating mode, the indoor evaporator 18 carries out heat exchange between the refrigerant which flows out of the second expansion valve 15b, and air to flow into the indoor condenser 12. In the indoor evaporator 18, the refrigerant decompressed by the second expansion valve 15b is evaporated to cool the air by absorbing heat. The indoor evaporator 18 is arranged in the casing 31 of the indoor air-conditioning unit 30, at upstream of the indoor condenser 12 in the air flow.

The inflow port side of the evaporating pressure regulating valve 19 is connected to the refrigerant outlet of the indoor evaporator 18. The evaporating pressure regulating valve 19 adjusts the refrigerant evaporating pressure (namely, the low-pressure side refrigerant pressure) in the indoor evaporator 18 to be more than or equal to a frost restricting pressure, in order to restrict frost from being generated on the indoor evaporator 18. In other words, the evaporating pressure regulating valve 19 adjusts the refrigerant evaporation temperature Te in the indoor evaporator 18 to be more than or equal to a predetermined frost restricting temperature.

As shown in FIG. 1, the fourth three-way joint 13d is connected to the outlet side of the evaporating pressure regulating valve 19. The fourth refrigerant passage 14d is connected to the other inflow port of the fourth three-way joint 13d. The inlet side of the accumulator 20 is connected to the outlet of the fourth three-way joint 13d.

The accumulator 20 is a gas-liquid separator in which the refrigerant which flowed into is divided into gas and liquid, and stores the refrigerant surplus in the cycle. The inlet port side of the compressor 11 is connected to the gas refrigerant outlet of the accumulator 20. The accumulator 20 restricts liquid refrigerant from entering the compressor 11, and achieves the function to prevent the liquid compression in the compressor 11.

The first opening-and-closing valve 21 is arranged in the fourth refrigerant passage 14d which connects the second three-way joint 13b to the fourth three-way joint 13d. The first opening-and-closing valve 21 may be configured by an electromagnetic valve. The first opening-and-closing valve 21 functions as a refrigerant circuit switching device which changes the refrigerant circuit by opening and closing the fourth refrigerant passage 14d. The operation of the first opening-and-closing valve 21 is controlled by a control signal outputted from the air-conditioning control device 40.

Similarly, the second opening-and-closing valve 22 is arranged in the second refrigerant passage 14b which connects the first three-way joint 13a to the third three-way joint 13c. The second opening-and-closing valve 22 may be configured by an electromagnetic valve, similarly to the first opening-and-closing valve 21. The second opening-and-closing valve 22 functions as a refrigerant circuit switching device which changes the refrigerant circuit by opening and closing the second refrigerant passage 14b.

Next, the indoor air-conditioning unit 30 is explained, which configures the air-conditioner 1 with the refrigerating cycle apparatus 10. The indoor air-conditioning unit 30 blows off the air with temperature adjusted by the refrigerating cycle apparatus 10 to the vehicle interior. The indoor air-conditioning unit 30 is arranged at the inner side of the foremost instrument board (instrument panel) in the vehicle interior.

As shown in FIG. 1, the indoor air-conditioning unit 30 has the fan 32, the indoor evaporator 18, and the indoor condenser 12, which are housed in the casing 31 forming the outer shape. The casing 31 forms the air passage for the air to be sent to the vehicle interior. The casing 31 has a certain elasticity, and is fabricated by resin (for example, polypropylene) outstanding also in the strength.

The inside/outside air switch device 33 is arranged at the most upstream in the air flow in the casing 31. The inside/ outside air switch device 33 switches inside air (indoor air of the vehicle) and outside air (outdoor air of the vehicle) to be introduced into the casing 31.

Specifically, the inside/outside air switch device 33 has an inside/outside air change door which adjusts continuously the opening areas of the inside air inlet port to introduce inside air into the casing 31 and the outside air inlet port to introduce outside air into the casing 31, to change continuously the ratio of the amount of inside air and the amount of outside air. The inside/outside air change door is driven by an electric actuator for the inside/outside air change door. The operation of the electric actuator is controlled by a control signal outputted from the air-conditioning control device 40.

The fan (blower) 32 is arranged downstream of the inside/outside air switch device 33 in the air flow. The fan 32 draws air through the inside/outside air switch device 33, and sends the air to the vehicle interior. The fan 32 is an electric blower in which a centrifugal multi-blade fan (sirocco fan) is driven by an electric motor. The number of rotations of the centrifugal multi-blade fan in the fan 32 is controlled by a control voltage outputted from the air-conditioning control device 40 to control the amount of air.

The indoor evaporator 18 and the indoor condenser 12 are arranged in this order at the downstream side of the fan 32 in the air flow. In other words, the indoor evaporator 18 is arranged upstream of the indoor condenser 12 in the air flow.

A cool-air bypass channel 35 is formed in the casing 31. The cool-air bypass channel 35 is a passage for making the air which passes through the indoor evaporator 18 to bypass the indoor condenser 12 and flow to the downstream side.

An air mixing door 34 is arranged downstream of the indoor evaporator 18 and upstream of the indoor condenser 12 in the air flow. The air mixing door 34 is used for adjusting the ratio of the amount of air passing through the indoor condenser 12 to the amount of air passing through the indoor evaporator 18. In the air-conditioner 1, the amount of heat exchange in the indoor condenser 12 can be made the minimum by the air mixing door 34 which fully opens the cool-air bypass channel 35 and which fully closes the channel of air to the indoor condenser 12.

A mix space is defined downstream of the indoor condenser 12 in the air flow. In the mix space, the air heated by the indoor condenser 12 and the air which passes through the cool-air bypass channel 35 without heated by the indoor condenser 12 are mixed with each other. Plural opening holes are defined at the most downstream part of the casing 31 in the air flow. The air mixed in the mix space (conditioned wind) is blown off through the opening holes to the vehicle interior which is a target space for air-conditioning.

The opening holes may include a face opening hole, a foot opening hole, and a defroster opening hole (which are shown). The face opening hole is an opening hole for blowing off conditioned wind towards the upper half body of an occupant in the vehicle interior. The foot opening hole is an opening hole for blowing off conditioned wind towards a foot of the occupant. The defroster opening hole is an opening hole for blowing off conditioned wind towards an internal surface of a front windshield of the vehicle.

The face opening hole, the foot opening hole, and the defroster opening hole are respectively connected to the face blow-off port, the foot blow-off port, and the defroster blow-off port (neither is illustrated) defined in the vehicle interior through a duct which forms an air passage. The air mixing door 34 adjusts the ratio of the amount of air which passes the indoor condenser 12 and the amount of air which passes the cool-air bypass channel 35, to control the temperature of the conditioned air mixed in the mix space and blown off from each blow-off port to the vehicle interior.

The air mixing door 34 functions as a temperature adjustment part which adjusts the temperature of the conditioned wind to be sent to the vehicle interior. The air mixing door 34 is driven by an electric actuator for the air mixing door. The operation of the electric actuator is controlled by a control signal outputted from the air-conditioning control device 40.

A face door which adjusts the opening area of the face opening hole, a foot door which adjusts the opening area of the foot opening hole, and a defroster door which adjusts the opening area of the defroster opening hole (neither is illustrated) are arranged respectively upstream side of the face opening hole, the foot opening hole, and the defroster opening hole in the air flow.

The face door, the foot door, and the defroster door correspond to a blow-off port mode change door which changes the blow-off port mode. The face door, the foot door, and the defroster door are connected with an electric actuator for the blow-off port mode door through a linkage mechanism, respectively, to control the rotation. The operation of the electric actuator is controlled by a control signal outputted from the air-conditioning control device 40.

The blow-off port mode is changed by the blow-off port mode change door, among a face mode, a bilevel mode, and a foot mode.

The face mode is a blow-off port mode in which the face blow-off port is full open, to blow off air from the face blow-off port towards the upper half body of an occupant in the vehicle interior. The bilevel mode is a blow-off port mode in which both of the face blow-off port and the foot blow-off port are open, to blow off air towards the upper half body and the foot of an occupant in the vehicle interior. The foot mode is a blow-off port mode in which the foot blow-off port is full open, to blow off air from the foot blow-off port towards the foot of an occupant in the vehicle interior.

The defroster mode may be set by an occupant through a manual operation of the blow-off mode changeover switch prepared in the navigational panel 60. The defroster mode is a blow-off port mode in which the defroster blow-off port is fully open to blow off air from the defroster blow-off port to the internal surface of the front windshield.

Figure 2:
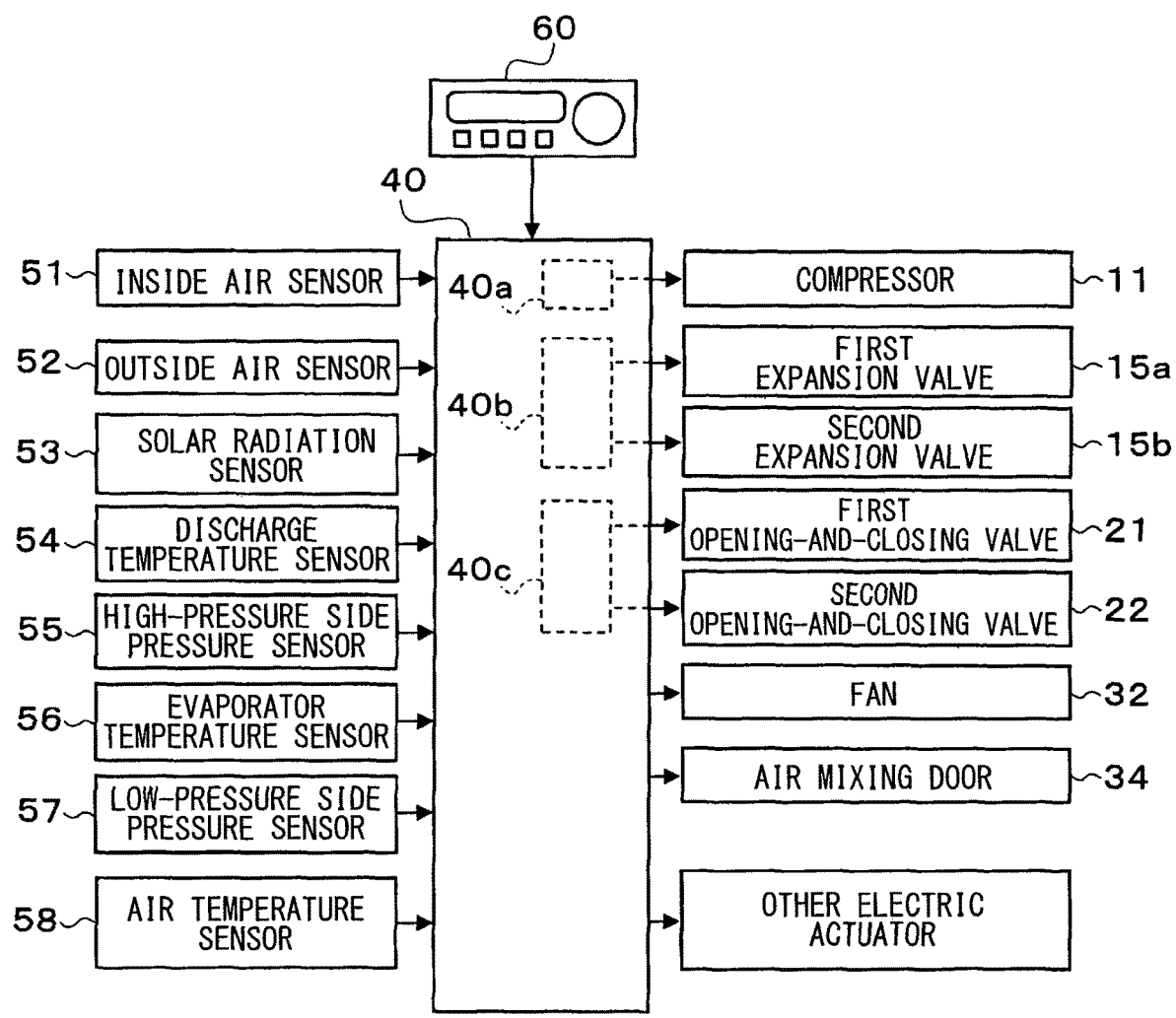
FIG. 2 is a block diagram illustrating a control system of the air-conditioner of the first embodiment.

Next, the control system of the air-conditioner 1 is explained, referring to FIG. 2. The air-conditioner 1 has the air-conditioning control device 40 for controlling the refrigerating cycle apparatus 10 and the indoor air-conditioning unit 30.

The air-conditioning control device 40 includes a microcomputer with CPU, ROM, RAM and its circumference circuit. The air-conditioning control device 40 performs various calculating and processing based on the control program memorized in the ROM, to control the operation of the air-conditioning control device such as the compressor 11, the first expansion valve 15a, the second expansion valve 15b, the first opening-and-closing valve 21, the second opening-and-closing valve 22, the fan 32, and the air mixing door 34 connected to the output side.

The detection signals of the sensors for controlling the air-conditioning are inputted into the input side of the air-conditioning control device 40. As shown in FIG. 2, the inside air sensor 51, the outside air sensor 52, the solar radiation sensor 53, the discharge temperature sensor 54, the high-pressure side pressure sensor 55, the evaporator temperature sensor 56, the low-pressure side pressure sensor 57, and the air temperature sensor 58 are provided for controlling the air-conditioning.

The inside air sensor 51 is an inside air temperature detecting element which detects the inside air temperature Tr in the vehicle interior. The outside air sensor 52 is an outside air temperature detecting element which detects the outside temperature Tam outside of the vehicle. The solar radiation sensor 53 is a solar radiation amount detecting element which detects the solar amount As irradiated to the vehicle interior. The discharge temperature sensor 54 is a discharge temperature detecting element which detects the temperature Td of refrigerant discharged from the compressor 11.

The high-pressure side pressure sensor 55 is a high-pressure side pressure sensing part which detects the pressure (the high-pressure side refrigerant pressure) Pd of refrigerant at the outlet side of the indoor condenser 12. The high-pressure side refrigerant pressure Pd is a pressure of refrigerant within the range from the discharge port side of the compressor 11 to the inlet side of the first expansion valve 15a in the heating mode. In the dehumidification heating mode, the high-pressure side refrigerant pressure Pd is a refrigerant pressure within the range from the discharge port side of the compressor 11 to the inlet side of the first expansion valve 15a and the inlet side of the second expansion valve 15b. In the cooling mode, the high-pressure side refrigerant pressure Pd is a refrigerant pressure within the range from the discharge port side of the compressor 11 to the inlet side of the second expansion valve 15b. In the defrosting mode, the high-pressure side refrigerant pressure Pd is a refrigerant pressure within the range from the discharge port side of the compressor 11 to the inlet side of the first expansion valve 15a.

The evaporator temperature sensor 56 is an evaporator temperature detecting element which detects the refrigerant evaporation temperature (evaporator temperature) Te in the indoor evaporator 18. The evaporator temperature sensor 56 detects the temperature of heat exchange fin of the indoor evaporator 18. A temperature detecting element which detects the temperature of the other part of the indoor evaporator 18 or a temperature detecting element which detects directly the temperature of the refrigerant itself which circulates the indoor evaporator 18 may be adopted as the evaporator temperature sensor 56.

The low-pressure side pressure sensor 57 is a low-pressure side pressure sensing part which detects the pressure of refrigerant on the low pressure side in the refrigerating cycle, and detects the refrigerant pressure at the inlet port side of the compressor 11 as the low-pressure side refrigerant pressure Ps. The low-pressure side refrigerant pressure Ps is a refrigerant pressure within the range from the outlet side of the first expansion valve 15a to the inlet port side of the compressor 11 in the heating mode. In the dehumidification heating mode and the cooling mode, the low-pressure side refrigerant pressure Ps is a refrigerant pressure within the range from the outlet side of the second expansion valve 15b to the inlet port side of the compressor 11. In the defrosting mode, the low-pressure side refrigerant pressure Ps is a refrigerant pressure within the range from the outlet side of the first expansion valve 15a to the inlet port side of the compressor 11, and has a value equivalent to the refrigerant pressure in the outdoor heat exchanger 16.

The navigational panel 60 is arranged near the instrument board at the front part of the vehicle interior, and is connected to the input side of the air-conditioning control device 40. The manipulation signal from various air-conditioning operation switches formed in the navigational panel 60 is inputted into the air-conditioning control device 40.

The various air-conditioning operation switches formed in the navigational panel 60 may include an auto switch, a cooling switch (A/C switch), an air amount setting switch, a temperature setting switch, and a blow-off mode changing switch.

The auto switch is an input unit for setting or canceling the automatic control operation of the air-conditioner 1. The cooling switch is an input unit for requiring a cooling of the vehicle interior. The air amount setting switch is an input unit for manually setting the air amount sent by the fan 32. The temperature setting switch is an input unit for setting a vehicle interior preset temperature Tset which is a target temperature of the vehicle interior. The blow-off mode changing switch is an input unit for manually setting the blow-off mode.

A vehicle control device (not shown) is connected to the input side of the air-conditioning control device 40. The vehicle control device conducts the various control about the driving of the vehicle including the air-conditioner 1, and is connected with a vehicle speed sensor. The air-conditioning control device 40 can acquire information representing the speed of the vehicle detected by the vehicle speed sensor through the vehicle control device.

A control part (control device) which controls the various air-conditioning control apparatus is integrally connected to the output side of the air-conditioning control device 40. The configuration (hardware and software) which controls the operation of each air-conditioning control apparatus corresponds to the control part which controls the operation of each air-conditioning control apparatus.

For example, the air-conditioning control device 40 has a discharge control part 40a which controls the operation of the compressor 11, and a refrigerant circuit control part 40b which controls the operations of the first opening-and-closing valve 21 and the second opening-and-closing valve 22 corresponding to a refrigerant circuit switch device.

Moreover, the air-conditioning control devices 40 has a decompression control part 40c which controls the operation of the first expansion valve 15a and the second expansion valve 15b corresponding to a pressure reducing device. The discharge control part 40a, the refrigerant circuit control part 40b, and the decompression control part 40c may be defined by other control part other than the air-conditioning control device 40.

Next, the operation of the air-conditioner 1 of the first embodiment is explained with reference to FIG. 3-FIG. 5. As mentioned above, in the air-conditioner 1, the operation mode can be changed among the heating mode, the dehumidification heating mode, the cooling mode, and the defrosting mode. The operation mode is changed by executing the air-conditioning control program memorized by ROM of the air-conditioning control device 40.

Figure 3:
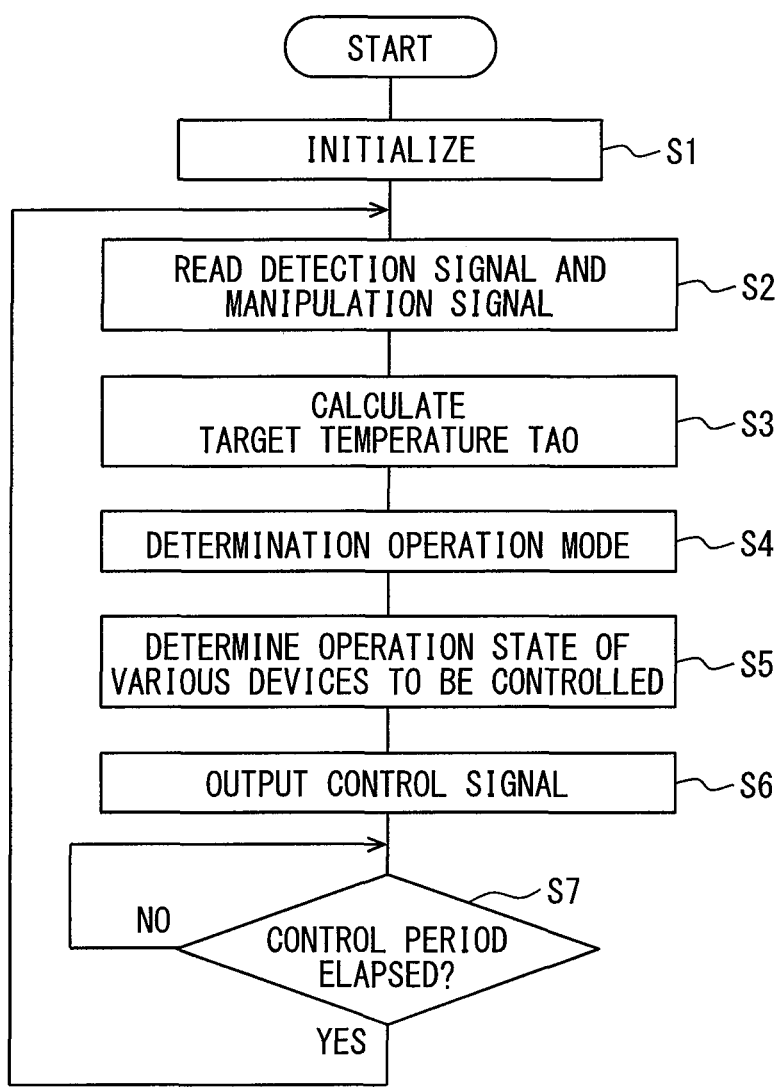
FIG. 3 is a flow chart of a control processing of the air-conditioner of the first embodiment.

FIG. 3 is a flow chart describing the control processing as a main routine of the air-conditioning control program. The control processing of this main routine is performed when the auto switch of the navigational panel 60 is turned ON. Each control step in the flow chart shown in FIG. 3-FIG. 5 defines various kinds of functional parts of the air-conditioning control device 40.

As shown in FIG. 3, at S1, initialization is performed for the air-conditioner 1. Specifically, the flag and the timer in the memory circuit of the air-conditioning control device 40 are initialized, and the positioning is initialized in the stepping motor of the electric actuators.

In the initialization of S1, some of the values such as flag or calculation value memorized when the vehicle system is ended or when the air-conditioner is stopped last time may be read out.

Then, at S2, the detection signals of the sensors 51-58 for controlling the air-conditioning and the manipulation signal of the navigational panel 60 are read in.

At S3, the target blow-off temperature TAO which is the target temperature of the air blown off to the vehicle interior is calculated based on the detection signals and manipulate signals read at S2.

Specifically, the target blow-off temperature TAO is calculated by the expression F1 below.

$$TAO = Kset \times Tset - Kr \times Tr - Kam \times Tam - Ks \times As + C \quad \text{(F1)}$$

Tset represents the vehicle interior preset temperature set by the temperature setting switch. Tr represents the vehicle interior (inside air) temperature detected by the inside air sensor 51. Tam represents the outside air temperature detected by the outside air sensor 52. As represents the amount of solar radiation detected by the solar radiation sensor 53. Kset, Kr, Kam, and Ks are control gains, and C is a constant for compensation.

The operation mode is determined at S4. Specifically, at S4, the subroutine shown in FIG. 4 is performed. First, at S41, it is determined whether the defrosting operation is needed for defrosting the outdoor heat exchanger 16. In this determination, for example, when the outside temperature Tam is 0° C. or less and a value calculated by subtracting the temperature of the outdoor heat exchanger 16 from the outside temperature Tam is more than or equal to a predetermined temperature difference, it is determined that frost arises in the outdoor heat exchanger 16, and it is necessary to perform the defrosting operation. When it is determined that it is necessary to conduct the defrosting operation, the control part progresses to S42. When it is determined that it is not necessary to conduct the defrosting operation, the control part advances to S43.

In S42, a time-priority defrosting mode is selected as an operation mode in the defrosting mode to shorten the period of time taken for defrosting the outdoor heat exchanger 16, or a power-saving defrosting mode is selected as an operation mode in the defrosting mode to reduce the integrated power consumption Ec of the compressor 11 required for defrosting the outdoor heat exchanger 16. Specifically, the mode select in the defrosting mode is performed in the subroutine shown in FIG. 5.

Figure 6:
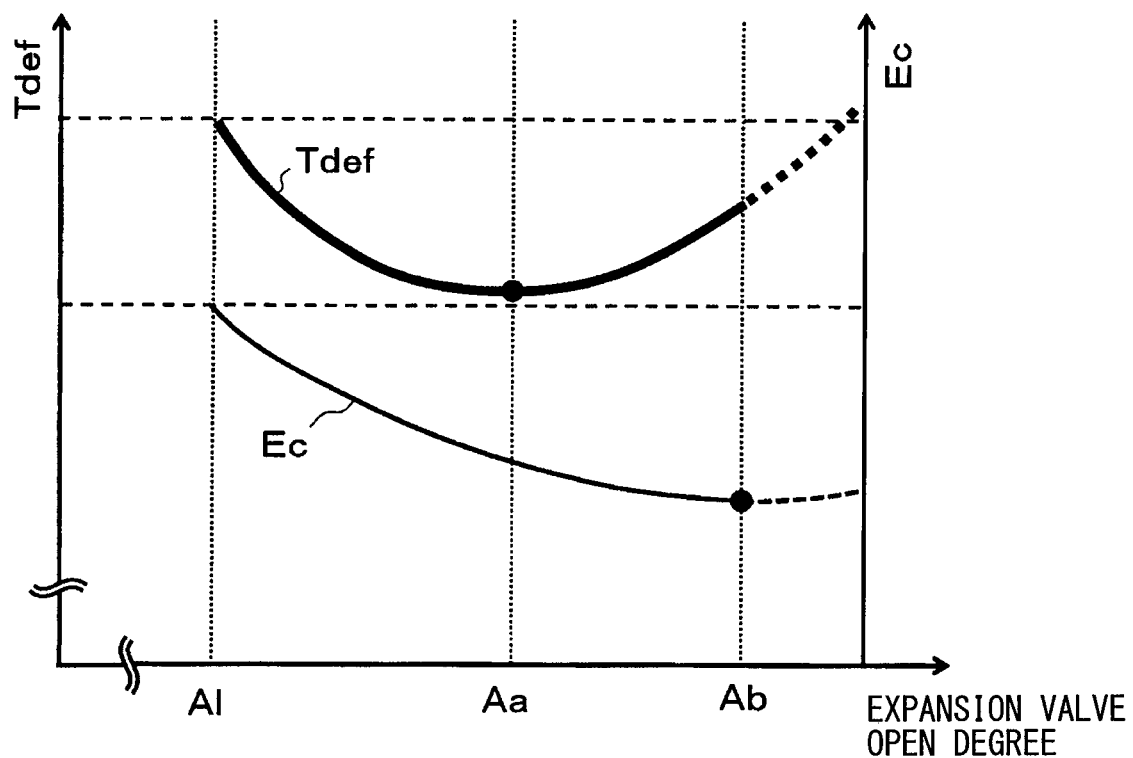
FIG. 6 is a graph illustrating a defrosting period of time and an integrated power consumption of a compressor relative to an opening degree of an expansion valve when a defrosting mode is set.

The time-priority defrosting mode and the power-saving defrosting mode are explained referring to FIG. 6, as an operation mode in the defrosting mode for defrosting the outdoor heat exchanger 16 in the refrigerating cycle apparatus 10 of the first embodiment.

As shown in FIG. 1, when the defrosting mode is set in the refrigerating cycle apparatus 10, the refrigerant circuit is formed, in which refrigerant that is hot gas discharged from the compressor 11 is decompressed by the first expansion valve 15a, and is made to flow into the outdoor heat exchanger 16. Thereby, the frost on the outdoor heat exchanger 16 melts and is removed by the heat of the high temperature refrigerant which flows through the outdoor heat exchanger 16.

The defrosting mode cannot be operated in parallel with the heating mode in the refrigerating cycle apparatus 10. That is, when the defrosting mode is selected, the air-conditioning function of the vehicle interior by the heating mode stops. Therefore, in consideration of improving the comfortableness in the vehicle interior, the defrosting of the outdoor heat exchanger 16 may be required to be finished in a short period of time while the integrated power consumption Ec taken for the defrosting increases.

The thick line in FIG. 6 represents a relation between the opening degree of the expansion valve (namely, the first expansion valve 15a) and the defrosting time Tdef taken for defrosting the outdoor heat exchanger 16, at the defrosting mode. The integrated power consumption Ec of the compressor 11 taken for the defrosting is an index representing a magnitude of the integrated power consumption of the compressor 11 during the defrosting operation in the refrigerating cycle apparatus 10, and is calculated by integrating the power consumption of the compressor 11 from the start to the end of the defrosting operation of the outdoor heat exchanger 16. The open degree of the first expansion valve 15a has a lower limit A for defrosting the outdoor heat exchanger 16. When the open degree of the first expansion valve 15a becomes lower than the lower limit Al, since the low-pressure side refrigerant pressure Ps of the refrigerating cycle apparatus 10 cannot rise, the defrosting of the outdoor heat exchanger 16 cannot be completed.

As shown in FIG. 6, the defrosting time Tdef becomes so short as the open degree of the first expansion valve 15a becomes larger from the lower limit Al. However, when the open degree of the first expansion valve 15a exceeds a certain point, the defrosting time Tdef becomes long as the open degree of the first expansion valve 15a is increased. That is, the open degree of the first expansion valve 15a has a first standard value Aa where the defrosting time Tdef is made the minimum.

In the time-priority defrosting mode of the first embodiment, the valve travel of the first expansion valve 15a is controlled to approach the first standard value Aa while performing the defrosting of the outdoor heat exchanger 16 so as to shorten the defrosting time Tdef taken for defrosting the outdoor heat exchanger 16.

On the other hand, it is also requested to reduce the integrated power consumption Ec of the compressor 11 as much as possible in the defrosting mode. FIG. 6 illustrates a relation between the open degree of the expansion valve (namely, the first expansion valve 15a) and the integrated power consumption Ec of the compressor 11 taken for the defrosting at the defrosting mode.

As shown in FIG. 6, the integrated power consumption Ec becomes smaller, as the open degree of the first expansion valve 15a becomes larger from the lower limit Al. The integrated power consumption Ec is reduced as the open degree of the first expansion valve 15a is increased to a certain value larger than the first standard value Aa.

When the open degree of the first expansion valve 15a becomes larger than the certain value, the integrated power consumption Ec increases gradually with increase in the open degree. That is, the open degree of the first expansion valve 15a has a second standard value Ab where the integrated power consumption Ec of the compressor 11 is made the minimum at the defrosting time.

In the power-saving defrosting mode of the first embodiment, the valve travel of the first expansion valve 15a is controlled to approach the second standard value Ab that is larger than the first standard value Aa, so as to reduce the integrated power consumption Ec of the compressor 11 taken for the defrosting.

As shown in FIG. 6, the integrated power consumption Ec at the first standard value Aa in the time-priority defrosting mode is larger than the integrated power consumption Ec at the second standard value Ab in the power-saving defrosting mode. The difference in the integrated power consumption Ec is caused by increase in the power consumption of the compressor 11 at the time-priority defrosting mode and by increase in the heat loss until the refrigerant reaches the outdoor heat exchanger 16 since the temperature of the refrigerant discharged from the compressor 11 is raised.

The subroutine performed at S42 is explained with reference to FIG. 5. After starting the subroutine for selecting the mode in the defrosting mode, in S51, it is determined whether the vehicle having the air-conditioner 1 is running or not, based on the information inputted from the speed sensor of the vehicle. That is, at S51, it is determined whether the speed of the vehicle is more than or equal to a predetermined standard speed. When it is determined that the vehicle is running, the control part progresses to S52. When it is determined that the vehicle is not running, the control part progresses to S53.

The standard speed to be compared with the speed detected by the speed sensor in S51 is suitably set. The standard speed may be a numerical value which shows a vehicle stop state, or may be a general speed when the vehicle is in a traffic congestion.

In S52, the operation mode in the defrosting mode is determined as the time-priority defrosting mode. When the vehicle is running, it is desirable to shorten the defrosting time Tdef of the outdoor heat exchanger 16, in order to shorten the period during which the heating mode is stopped, to improve the comfortableness in the vehicle interior. As shown in FIG. 6, the integrated power consumption Ec becomes large in the time-priority defrosting mode than in the power-saving defrosting mode, but the defrosting time Tdef becomes short in the time-priority defrosting mode than in the power-saving defrosting mode. After the time-priority defrosting mode is selected, the control part proceeds to S5 in FIG. 3.

In S53, the operation mode in the defrosting mode is determined as the power-saving defrosting mode. When the vehicle is not running, it is desirable to restrict increase in the integrated power consumption Ec of the compressor 11 taken for defrosting the outdoor heat exchanger 16 than to shortened the defrosting time Tdef of the outdoor heat exchanger 16. The integrated power consumption Ec can be reduced in the power-saving defrosting mode than in the time-priority defrosting mode, while the defrosting time Tdef becomes long in the power-saving defrosting mode than in the time-priority defrosting mode. After the power-saving defrosting mode is selected, the control part proceeds to S5 in FIG. 3.

Figure 4:
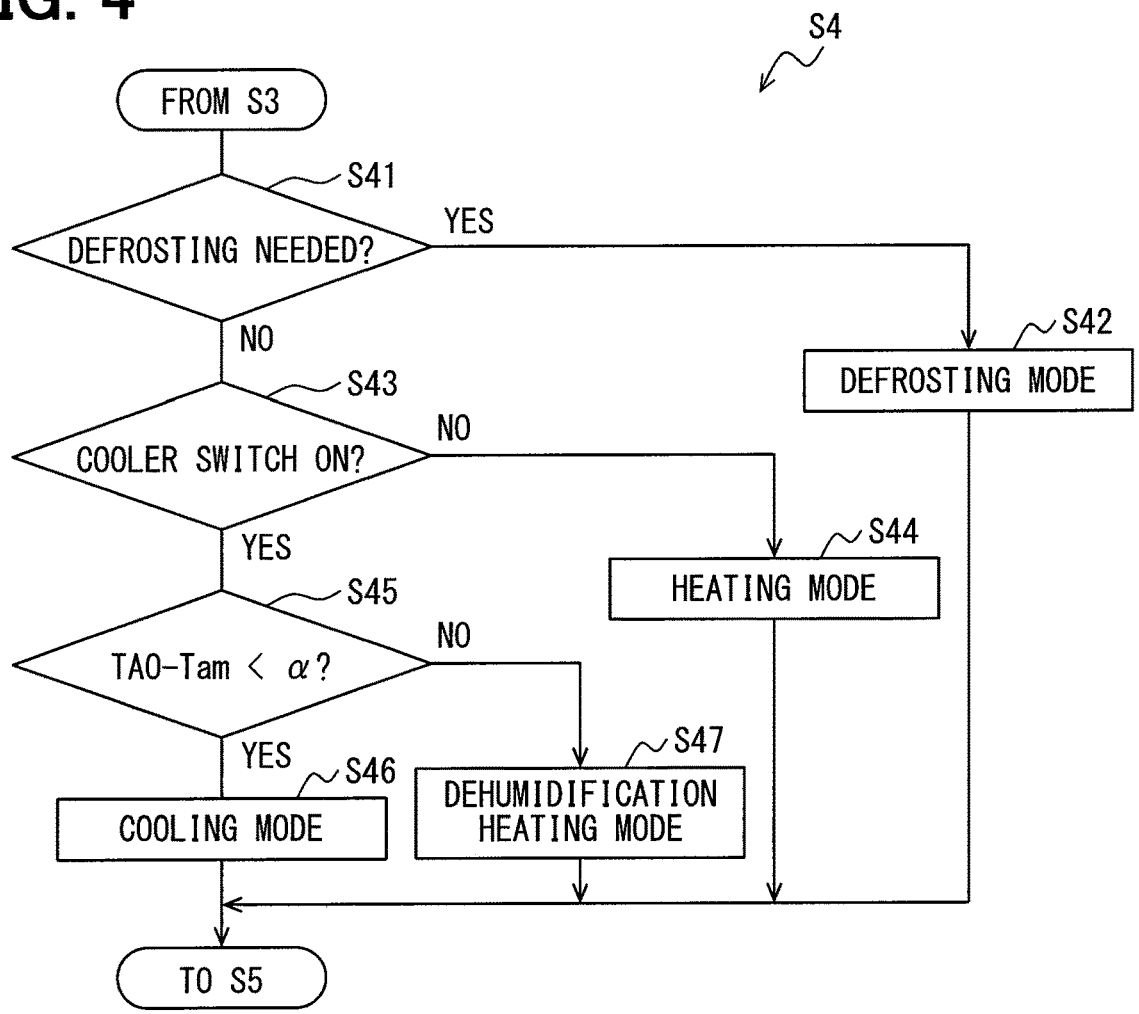
FIG. 4 is a flow chart of a subroutine to determine an operation mode in the control processing of the air-conditioner of the first embodiment.
Figure 5:
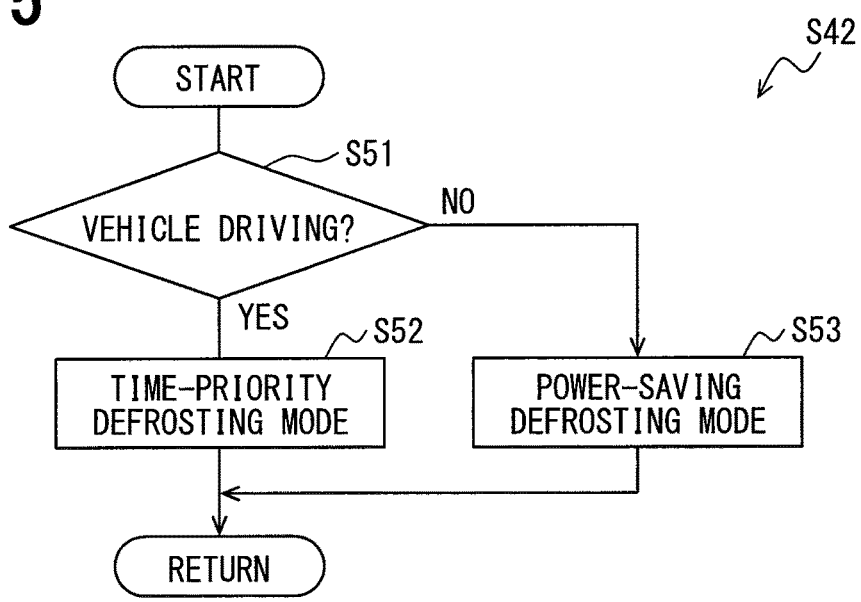
FIG. 5 is a flow chart of a subroutine to select a defrosting mode in the control processing of the air-conditioner of the first embodiment.

The processing of the subroutines S43-S47 to determination the operation mode is explained referring to FIG. 4. At S43, it is determined whether the cooing switch of the navigational panel 60 is on. When it is determined that the cooling switch is set ON at S43, the control part progresses to S45. When it is determined that the cooling switch is set OFF at S43, the control part progresses to S44 to set the operation mode as the heating mode, and shifts to S5.

At S45, it is determined whether the value (TAO−Tam) calculated by subtracting the outside temperature Tam from the target blow-off temperature TAO is lower than a predetermined standard cooling temperature α (α=0 in this embodiment). When (TAO−Tam)<α is satisfied at S45, the control part progresses to S46 to set the operation mode as the cooling mode, and shifts to S5. When (TAO−Tam)<α is not satisfied at S45, the control part progresses to S47 to set the operation mode as the dehumidification heating mode, and shifts to S5.

As shown in FIG. 3, after the operation mode is determined in S4, the operation state of various devices to be controlled is determined at S5 according to the operation mode determined at S4. More specifically, at S5, as shown in the chart of FIG. 7, the opening-and-closing state of the first opening-and-closing valve 21 and the second opening-and-closing valve 22, the position of the air mixing door 34, the operation state of the first expansion valve 15a, the second expansion valve 15b, and the fan 32 are determined.

Furthermore, the refrigerant discharge rate of the compressor 11 (namely, number of rotations of the compressor 11), the operation state of the inside/outside air switch device 33, the operation state of the blow-off port mode change door (namely, blow-off port mode) are determined at S5, although they are not mentioned in FIG. 7.

At S6, a control signal or control voltage is outputted from the air-conditioning control device 40 to various devices for controlling the air-conditioning so that the operation state determined at S5 can be acquired. At S7, when it is determined that a control period is elapsed, the control part returns to S2.

In the air-conditioner 1, the operation mode is determined like the above, and the operation is executed at each operation mode as follows.

(a) Heating Mode

In the heating mode, as shown in the chart of FIG. 7, the air-conditioning control device 40 opens the first opening-and-closing valve 21, and closes the second opening-and-closing valve 22. Moreover, the first expansion valve 15a is made in the opening-reduced state to conduct a decompression action, and the second expansion valve 15b is made in the full closed state.

Thus, as shown in the black arrow of FIG. 1, in the heating mode, the vapor compression refrigerating cycle is defined to circulate refrigerant in order of the compressor 11, the indoor condenser 12, the first expansion valve 15a, the outdoor heat exchanger 16, (the first opening-and-closing valve 21), the accumulator 20, and the compressor 11.

Furthermore, with the configuration of this refrigerant circuit, as explained in S5, the air-conditioning control device 40 determines the operation state of the various air-conditioning devices at the heating mode, and outputs the control signals to the various air-conditioning devices.

For example, the control signal outputted to the electric motor of the compressor 11 is determined as follows. First, a target condensing pressure PCO in the indoor condenser 12 is determined with reference to the control map beforehand memorized by the air-conditioning control device 40 based on the target blow-off temperature TAO. On this control map, the target condensing pressure PCO is determined to increase as the target blow-off temperature TAO is raised.

The control signal to be outputted to the electric motor of the compressor 11 is determined so that the high-pressure side refrigerant pressure Pd approaches the target condensing pressure PCO using the feedback control technique based on the deviation between the target condensing pressure PCO and the high-pressure side refrigerant pressure Pd detected by the high-pressure side pressure sensor 55.

The control signal outputted to the electric actuator for driving the air mixing door causes the air mixing door 34 to fully close the cool-air bypass channel 35, such that the total flow of air passing the indoor evaporator 18 will pass through the air passage in the indoor condenser 12.

The control signal outputted to the first expansion valve 15a is determined such that the supercooling degree of refrigerant which flows into the first expansion valve 15a will approach a target supercooling degree. The target supercooling degree is a value determined such that the coefficient of performance (COP) of the cycle becomes the maximum.

The control voltage outputted to the electric motor of the fan 32 is determined with reference to the control map beforehand memorized by the air-conditioning control device 40 based on the target blow-off temperature TAO. In this control map, the amount of air is made the maximum when the target blow-off temperature TAO is in the very low temperature region (the maximum cooling region) and the very high temperature region (the maximum heating region).

As the target blow-off temperature TAO is increased toward a middle temperature region from the very low temperature region, the amount of air is decreased. As the target blow-off temperature TAO is decreased toward a middle temperature region from the very high temperature region, the amount of air is decreased. When the target blow-off temperature TAO is in the middle temperature region, the amount of air is made the minimum.

The control signal outputted to the electric actuator for the inside/outside air change door is determined with reference to the control map beforehand memorized by the air-conditioning control device 40 based on the target blow-off temperature TAO. On this control map, the outside air mode is set to introduce outside air fundamentally. When the target blow-off temperature TAO is in the high temperature region to get high heating performance, the inside air mode is set to introduce inside air.

The control signal outputted to the electric actuator for driving the blow-off port mode door is determined with reference to the control map beforehand memorized by the air-conditioning control device 40 based on the target blow-off temperature TAO. On this control map, as the target blow-off temperature TAO is lowered to a low temperature region from a high temperature region, the blow-off port mode is changed in order of the foot mode, the bilevel mode and the face mode.

Therefore, with the refrigerating cycle apparatus 10 at the heating mode, the high-pressure refrigerant breathed out from the compressor 11 flows into the indoor condenser 12. Since the air mixing door 34 opens the air passage in the indoor condenser 12, heat exchange is performed between the refrigerant which flowed into the indoor condenser 12 and the air sent from the fan 32 to pass the indoor evaporator 18, to radiate heat. Thereby, the air is heated.

Since the second opening-and-closing valve 22 is closed, the refrigerant which flowed out of the indoor condenser 12 flows into the first refrigerant passage 14a through the first three-way joint 13a, and is decompressed with the first expansion valve 15a to become a low-pressure refrigerant. The low-pressure refrigerant decompressed with the first expansion valve 15a flows into the outdoor heat exchanger 16, and absorbs heat from the outside air sent by the fan.

Since the first opening-and-closing valve 21 is opened and the second expansion valve 15b is in the full closed state, the refrigerant which flowed out of the outdoor heat exchanger 16 flows into the accumulator 20 through the second three-way joint 13b, the fourth refrigerant passage 14d, and the fourth three-way joint 13d, such that gas/liquid separation is carried out. The gas phase refrigerant separated with the accumulator 20 is drawn into the inlet side of the compressor 11, and is again compressed with the compressor 11.

Since the air heated with the indoor condenser 12 can be blown off to the vehicle interior in the heating mode, the vehicle interior can be heated.

(b) Dehumidification Heating Mode

In the dehumidification heating mode, as shown in the chart of FIG. 7, the air-conditioning control device 40 opens the first opening-and-closing valve 21 and the second opening-and-closing valve 22, and the first expansion valve 15a and the second expansion valve 15b are made in the opening-reduced state.

In the dehumidification heating mode, as shown in the slash hatching arrow of FIG. 1, refrigerant circulates in order of the compressor 11, the indoor condenser 12, the first expansion valve 15a, the outdoor heat exchanger 16, (the first opening-and-closing valve 21), the accumulator 20 and the compressor 11, and refrigerant circulates in order of the compressor 11, the indoor condenser 12, (the second opening-and-closing valve 22), the second expansion valve 15b, the indoor evaporator 18, the evaporating pressure regulating valve 19, the accumulator 20 and the compressor 11.

That is, in the dehumidification heating mode, the flow of the refrigerant which flowed out of the indoor condenser 12 is branched by the first three-way joint 13a. One of the branched refrigerant flows is made to flow in order of the first expansion valve 15a, the outdoor heat exchanger 16 and the compressor 11, and the other branched refrigerant flow is made to flow in order of the second expansion valve 15b, the indoor evaporator 18, the evaporating pressure regulating valve 19 and the compressor 11.

Furthermore, with the configuration of this refrigerant circuit, as explained in S5, the air-conditioning control device 40 determines the operation state of the various air-conditioning devices at the dehumidification heating mode.

For example, the control signal to be outputted to the electric motor of the compressor 11 is determined similarly as in the heating mode. The control signal outputted to the electric actuator for driving the air mixing door, like the heating mode, causes the air mixing door 34 to fully close the cool-air bypass channel 35, and is determined such that the total flow of air passing the indoor evaporator 18 will pass through the air passage in the indoor condenser 12.

The control signal outputted to the first expansion valve 15a is determined similarly as in the heating mode such that the supercooling degree of refrigerant which flows into the first expansion valve 15a will approach a target supercooling degree. The target supercooling degree is a value determined such that the coefficient of performance (COP) of the cycle becomes approximately the maximum.

The control signal outputted to the second expansion valve 15b is determined such that the flow rate of refrigerant which circulates the indoor evaporator 18 will be suitable. Specifically, the opening degree of the second expansion valve 15b is adjusted such that the superheat degree of refrigerant at the outlet side of the indoor evaporator 18 has a predetermined standard superheat degree (for example, 5° C.).

The control voltage outputted to the electric motor of the fan 32 is determined similarly as in the heating mode. The control signal outputted to the electric actuator for driving the blow-off port mode door is determined similarly as in the heating mode.

The control signal outputted to the electric actuator for the inside/outside air change door of the inside/outside air switch device 33 is set to introduce outside air (namely, the ratio of inside air is the minimum) as an initial state. Then, the control signal outputted to the electric actuator for the inside/outside air change door is suitably determined by performing the subroutine shown in FIG. 6 based on the refrigerant evaporation temperature Te in the indoor evaporator 18 detected by the evaporator temperature sensor 56 and the target blow-off temperature TAO.

In the dehumidification heating mode, when the various air-conditioning devices operate as determined in this way, the high-pressure refrigerant discharged out of the compressor 11 flows into the indoor condenser 12 in the refrigerating cycle apparatus 10. Since the air mixing door 34 opens the air passage in the indoor condenser 12, heat exchange is performed between the refrigerant which flowed into the indoor condenser 12 and the air sent from the fan 32 to pass the indoor evaporator 18, similarly as in the heating mode, to radiate heat. Thereby, the air is heated.

Since the second opening-and-closing valve 22 is opened, the flow of the refrigerant which flowed out of the indoor condenser 12 is branched by the first three-way joint 13*a*. One refrigerant flow branched at the first three-way joint 13*a* flows into the first refrigerant passage 14*a*, and is decompressed by the first expansion valve 15*a* to become a low-pressure refrigerant. The low-pressure refrigerant decompressed by the first expansion valve 15*a* flows into the outdoor heat exchanger 16, and absorbs heat from the outside air sent by the fan.

The other refrigerant flow branched at the first three-way joint 13*a* flows into the second refrigerant passage 14*b*. Due to the check valve 17, the refrigerant which flowed into the second refrigerant passage 14*b* does not flow into the outdoor heat exchanger 16, and flows into the second expansion valve 15*b* through the second opening-and-closing valve 22 and the third three-way joint 13*c*.

The refrigerant which flowed into the second expansion valve 15*b* is decompressed to becomes a low-pressure refrigerant. The low-pressure refrigerant decompressed by the second expansion valve 15*b* flows into the indoor evaporator 18, and evaporates by absorbing heat from the air sent from the fan 32. Thereby, the air is cooled. The refrigerant which flowed out of the indoor evaporator 18 is decompressed by the evaporating pressure regulating valve 19, and has a pressure equivalent to the refrigerant which flowed out of the outdoor heat exchanger 16.

The refrigerant which flowed out of the evaporating pressure regulating valve 19 flows into the fourth three-way joint 13*d*, and joins with the refrigerant which flowed out of the outdoor heat exchanger 16. The refrigerant joined at the fourth three-way joint 13*d* flows into the accumulator 20, and gas/liquid separation is carried out. The gas phase refrigerant separated by the accumulator 20 is drawn in the inlet side of the compressor 11, and is again compressed by the compressor 11.

Thus, in the dehumidification heating mode, the air cooled and dehumidified by the indoor evaporator 18 is re-heated by the indoor condenser 12 and blown off to the vehicle interior to dehumidify and heat the vehicle interior.

(c) Cooling Mode

In the cooling mode, as shown in the chart of FIG. 7, the air-conditioning control device 40 closes the first opening-and-closing valve 21 and the second opening-and-closing valve 22. Moreover, the air-conditioning control device 40 puts the first expansion valve 15*a* in the full open state, and puts the second expansion valve 15*b* in the opening-reduced state.

In the cooling mode, as shown in the white arrow of FIG. 1, the vapor compression refrigerating cycle is formed to circulate refrigerant in order of the compressor 11, the indoor condenser 12, (the first expansion valve 15*a*), the outdoor heat exchanger 16, (the check valve 17), the second expansion valve 15*b*, the indoor evaporator 18, the evaporating pressure regulating valve 19, the accumulator 20 and the compressor 11.

Furthermore, with the configuration of this refrigerant circuit, as explained in S5, the air-conditioning control device 40 determines the operation state of the various air-conditioning devices at the cooling mode.

For example, the control signal outputted to the electric motor of the compressor 11 is determined as follows. First, the target evaporation temperature TEO in the indoor evaporator 18 is determined with reference to the control map beforehand memorized by the air-conditioning control device 40 based on the target blow-off temperature TAO. On this control map, the target evaporation temperature TEO is reduced as the target blow-off temperature TAO is lowered. Furthermore, in order to restrict the frosting on the indoor evaporator 18, a lower limit (for example, 2° C.) is set for the target evaporation temperature TEO.

The control signal outputted to the electric motor of the compressor 11 is determined so that the refrigerant evaporation temperature Te approaches the target evaporation temperature TEO using the feedback control technique based on the deviation between the target evaporation temperature TEO and the refrigerant evaporation temperature Te detected by the evaporator temperature sensor 56.

The control signal outputted to the electric actuator of the air mixing door 34 causes the air mixing door 34 to fully open the cool-air bypass channel 35, and is determined such that the total flow of air passing the indoor evaporator 18 will pass through the cool-air bypass channel 35. In the cooling mode, the valve travel of the air mixing door 34 is controlled so that the air temperature TAV approaches the target blow-off temperature TAO.

The control signal outputted to the second expansion valve 15*b* is determined such that the supercooling degree of refrigerant which flows into the second expansion valve 15*b* will approach a target supercooling degree. The target supercooling degree is a value determined such that the coefficient of performance (COP) of the cycle becomes the maximum.

The control voltage outputted to the electric motor of the fan 32 is determined similarly as in the heating mode and the dehumidification heating mode. The control signal outputted to the electric actuator for the inside/outside air change door is determined similarly as in the heating mode. The control signal outputted to the electric actuator for driving the blow-off port mode door is determined similarly as in the heating mode and the dehumidification heating mode.

Therefore, with the refrigerating cycle apparatus 10 at the cooling mode, the high-pressure refrigerant discharged from the compressor 11 flows into the indoor condenser 12. At this time, since the air mixing door 34 fully closes the air passage in the indoor condenser 12, most of refrigerant which flowed into the indoor condenser 12 flows out of the indoor condenser 12, without carrying out heat exchange with air.

Since the second opening-and-closing valve 22 is closed, the refrigerant which flowed out of the indoor condenser 12 flows into the first refrigerant passage 14*a* through the first three-way joint 13*a*, and flows into the first expansion valve 15*a*. Since the first expansion valve 15*a* is in the full open state, the refrigerant which flowed out of the indoor condenser 12 flows into the outdoor heat exchanger 16, without being decompressed by the first expansion valve 15*a*.

The refrigerant which flowed into the outdoor heat exchanger 16 radiates heat in the outdoor heat exchanger 16 to the outside air sent by the fan. Since the first opening-and-closing valve 21 is closed, the refrigerant which flowed out of the outdoor heat exchanger 16 flows into the third refrigerant passage 14*c* through the second three-way joint 13*b*, and is decompressed by the second expansion valve 15*b* to be a low-pressure refrigerant.

The low-pressure refrigerant decompressed by the second expansion valve 15*b* flows into the indoor evaporator 18, and evaporates by absorbing heat from the air sent from the fan 32. Thereby, the air is cooled. The refrigerant which flowed out of the indoor evaporator 18 flows into the accumulator 20 through the evaporating pressure regulating valve 19, and gas/liquid separation is carried out. The gas phase refrigerant separated by the accumulator 20 is drawn into the inlet side of the compressor 11, and is again compressed by the compressor 11.

Thus, in the cooling mode, the vehicle interior can be cooled by blowing off the air cooled by the indoor evaporator 18 to the vehicle interior.

Therefore, the air-conditioner 1 of this embodiment can perform suitable air-conditioning for the vehicle interior by changing the operation mode among the heating mode, the dehumidification heating mode, and the cooling mode.

(d) Time-priority Defrosting Mode

In the time-priority defrosting mode, as shown in the chart of FIG. 7, the air-conditioning control device 40 opens the first opening-and-closing valve 21, and closes the second opening-and-closing valve 22. The first expansion valve 15a is made in the opening-reduced state to conduct a decompression, and the second expansion valve 15b is made in the full closed state.

In the time-priority defrosting mode, as shown in the horizontal hatching arrow in FIG. 1, a hot gas cycle is defined to circulate refrigerant in order of the compressor 11, the indoor condenser 12, the first expansion valve 15a, the outdoor heat exchanger 16, (the first opening-and-closing valve 21), the accumulator 20 and the compressor 11 as a vapor compression refrigerating cycle.

Furthermore, with the configuration of this refrigerant circuit, as explained in S5, the air-conditioning control device 40 determines the operation state of the various air-conditioning devices at the time-priority defrosting mode, and outputs the control signal to the various air-conditioning devices.

For example, the control signal outputted to the electric motor of the compressor 11 is determined to produce a predetermined number of rotations, in order to achieve a predetermined refrigerant discharge performance.

The control signal outputted to the electric actuator for driving the air mixing door causes the air mixing door 34 to fully open the cool-air bypass channel 35, such that the total flow of air passing the indoor evaporator 18 will pass through the cool-air bypass channel 35. The control signal outputted to the electric motor of the fan 32 is determined to stop ventilation operation by the fan 32. Therefore, in the time-priority defrosting mode, heat is not exchanged with refrigerant in the indoor condenser 12.

The control signal outputted to the first expansion valve 15a is determined, in the time-priority defrosting mode, such that the open degree of the first expansion valve 15a approaches the first standard value Aa. Thereby, in the time-priority defrosting mode, the low-pressure side refrigerant pressure Ps detected by the low-pressure side pressure sensor 57 is controlled to approach the standard low-pressure side pressure KPs at which the outdoor heat exchanger 16 can be defrosted. The standard low-pressure side pressure KPs corresponds to the first standard value Aa.

Thus, the operation state of the various air-conditioning devices is controlled. The state of the refrigerant in the refrigerating cycle operated in the time-priority defrosting mode is explained referring to the Mollier diagram shown in FIG. 8.

Figure 8:
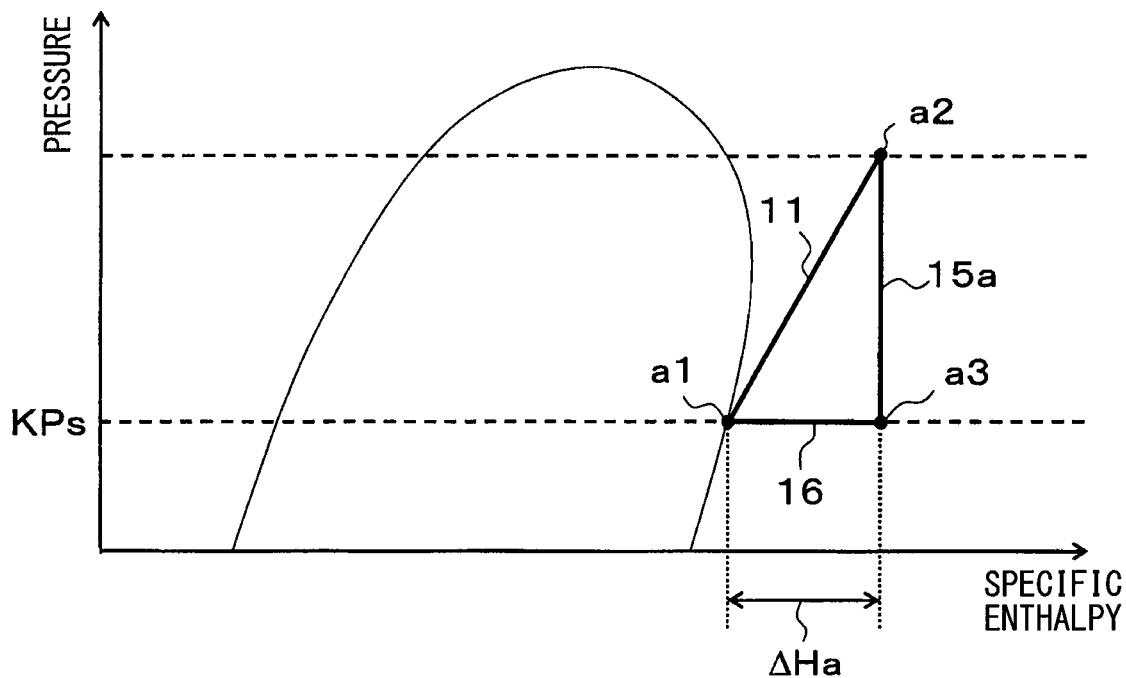
FIG. 8 is a Mollier diagram illustrating a state of refrigerant when a time-priority defrosting mode is set.

With the refrigerating cycle apparatus 10 at the time-priority defrosting mode, as shown in a point a1 and a point a2 of FIG. 8, the high-pressure refrigerant discharged from the compressor 11 flows into the indoor condenser 12. Here, since the air mixing door 34 fully closes the air passage in the indoor condenser 12, and operation of the fan 32 is also stopped, heat exchange is not carried out between the refrigerant which flowed into the indoor condenser 12 and air sent from the fan 32 to pass through the indoor evaporator 18.

Therefore, the refrigerant flows out of the indoor condenser 12 in the state of the hot gas with high temperature and high pressure. Since the second opening-and-closing valve 22 is closed, the refrigerant in the overheat state flows into the first refrigerant passage 14a through the first three-way joint 13a to reach the first expansion valve 15a.

As shown in the point a2 and a point a3 in FIG. 8, when flowing into the first expansion valve 15a, the refrigerant in the overheat state will be decompressed to be low-pressure refrigerant. At this time, since the open degree of the first expansion valve 15a is controlled to approach the first standard value Aa, the refrigerant which flowed out of the first expansion valve 15a is decompressed to have a value near the standard low-pressure side pressure KPs.

As shown in the point a3 and the point a1 of FIG. 8, the low-pressure refrigerant decompressed by the first expansion valve 15a flows into the outdoor heat exchanger 16 on which frost is generated, while the refrigerant is still in the overheat state. Therefore, the frost on the outdoor heat exchanger 16 melts and is removed by the heat of the refrigerant in the overheat state.

Then, since the first opening-and-closing valve 21 is opened and the second expansion valve 15b is in the full closed state, the refrigerant which flowed out of the outdoor heat exchanger 16 flows into the fourth refrigerant passage 14d through the second three-way joint 13b, flows into the accumulator 20 through the fourth three-way joint 13d, and gas/liquid separation is carried out. The gas phase refrigerant separated by the accumulator 20 is drawn into the inlet side of the compressor 11, and is again compressed by the compressor 11.

In the time-priority defrosting mode, since the refrigerant in the overheat state can be circulated in the cycle including the outdoor heat exchanger 16, the outdoor heat exchanger 16 can be defrosted. Moreover, the valve travel of the first expansion valve 15a is adjusted so that the low-pressure side refrigerant pressure Ps approaches the standard low-pressure side pressure KPs in the refrigerating cycle at the time-priority defrosting mode. Therefore, the temperature of the outdoor heat exchanger 16 can be maintained to the defrosting possible temperature, and enthalpy which can be used for the defrosting is fully securable like an enthalpy ΔHa shown between the point a3 and the point a1 of FIG. 8.

(e) Power-saving Defrosting Mode

As shown in the chart of FIG. 7, the air-conditioning control device 40 opens the first opening-and-closing valve 21, and closes the second opening-and-closing valve 22. The first expansion valve 15a is made in the opening-reduced state to decompress, and the second expansion valve 15b is made in the fully closed state.

In the power-saving defrosting mode, as shown in the horizontal hatching arrow in FIG. 1, a hot gas cycle is defined to circulate refrigerant in order of the compressor 11, the indoor condenser 12, the first expansion valve 15a, the outdoor heat exchanger 16, (the first opening-and-closing valve 21), the accumulator 20 and the compressor 11 as a vapor compression refrigerating cycle.

Furthermore, with the configuration of this refrigerant circuit, as explained in S5, the air-conditioning control device 40 determines the operation state of the various air-conditioning devices at the power-saving defrosting mode, and outputs the control signal to the various air-conditioning devices. The control signal outputted to the compressor 11, the air mixing door, and the fan 32 is the same as that in the time-priority defrosting mode, the redundant explanation is omitted.

The control signal outputted to the first expansion valve 15a is determined in the power-saving defrosting mode such that the valve travel of the first expansion valve 15a will approach the second standard value Ab. As shown in FIG. 6, the second standard value Ab is set such that the integrated power consumption Ec of the compressor 11 for defrosting the outdoor heat exchanger 16 becomes the minimum, and is an opening degree larger than the first standard value Aa in the time-priority defrosting mode.

Thus, the operation state of the various air-conditioning devices is controlled. The state of the refrigerant in the refrigerating cycle operated in the power-saving defrosting mode is explained referring to the Mollier diagram shown in FIG. 9.

Figure 9:
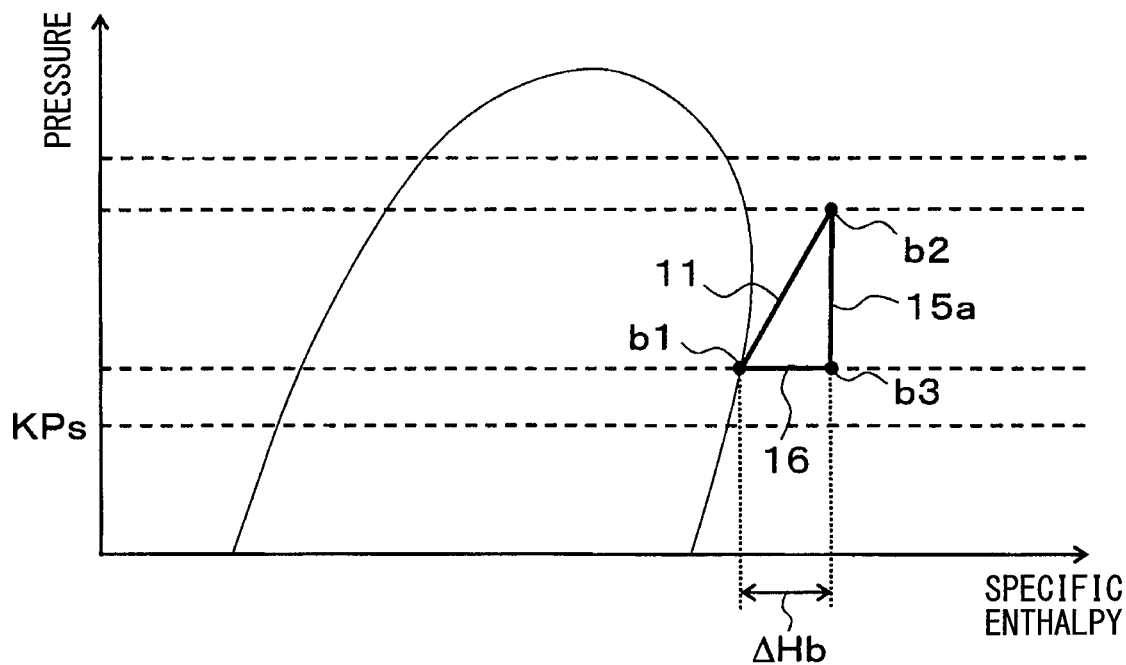
FIG. 9 is a Mollier diagram illustrating a state of refrigerant when a power-saving defrosting mode is set.

In the refrigerating cycle apparatus 10 at the power-saving defrosting mode, as shown in a point b1 and a point b2 of FIG. 9, the high-pressure refrigerant discharged from the compressor 11 flows into the indoor condenser 12. Also in this case, since the air mixing door 34 fully closes the air passage of the indoor condenser 12, and the operation of the fan 32 is also stopped, heat exchange is not carried out between the refrigerant which flowed into the indoor condenser 12 and air sent from the fan 32.

Therefore, the refrigerant flows out of the indoor condenser 12 in the state of hot gas with high temperature and high pressure. Since the second opening-and-closing valve 22 is closed, the refrigerant in the overheat state flows into the first refrigerant passage 14a through the first three-way joint 13a to reach the first expansion valve 15a.

As shown in the point b2 and a point b3 in FIG. 9, when flowing into the first expansion valve 15a, the refrigerant in the overheat state is decompressed to be low-pressure refrigerant. Since the valve travel of the first expansion valve 15a is controlled to approach the second standard value Ab, the low-pressure side refrigerant pressure Ps of the refrigerant which flowed out of the first expansion valve 15a has a value larger than the standard low-pressure side pressure KPs at the time-priority defrosting mode.

As shown in the point b3 and the point b1 of FIG. 9, the low-pressure refrigerant decompressed by the first expansion valve 15a flows into the outdoor heat exchanger 16, on which frost is generated, in the overheat state. Therefore, the frost in the outdoor heat exchanger 16 melts, and is removed by the heat of the refrigerant in the overheat state.

Then, since the first opening-and-closing valve 21 is opened and the second expansion valve 15b is in the full closed state, the refrigerant which flowed out of the outdoor heat exchanger 16 flows into the fourth refrigerant passage 14d through the second three-way joint 13b, flows into the accumulator 20 through the fourth three-way joint 13d, and gas/liquid separation is carried out. The gas phase refrigerant separated by the accumulator 20 is drawn into the inlet side of the compressor 11, and is again compressed by the compressor 11.

Since the refrigerant in the overheat state can be circulated at the power-saving defrosting mode in the cycle including the outdoor heat exchanger 16, the outdoor heat exchanger 16 can be defrosted. Moreover, since the valve travel of the first expansion valve 15a is adjusted to approach the second standard value Ab in the refrigerating cycle at the power-saving defrosting mode, the integrated power consumption Ec of the compressor 11 required for defrosting can be controlled to the minimum, and the temperature in the outdoor heat exchanger 16 can be maintained to the defrosting possible temperature.

As shown in FIG. 6, the open degree of the first expansion valve 15a at which the defrosting time Tdef becomes the shortest (namely, the first standard value Aa), and the open degree of the first expansion valve 15a at which the integrated power consumption Ec of the compressor 11 becomes the minimum (namely, the second standard value Ab) are different from each other in the refrigerating cycle apparatus 10. The valve travel of the first expansion valve 15a is controlled to approach the first standard value Aa in the time-priority defrosting mode, and is controlled to approach the second standard value Ab in the power-saving defrosting mode.

Therefore, as shown in FIG. 8 and FIG. 9, the enthalpy ΔHb which can be used for defrosting the outdoor heat exchanger 16 in the power-saving defrosting mode becomes smaller than the enthalpy ΔHa in the time-priority defrosting mode. Namely, since the enthalpy ΔHb which can be used for defrosting the outdoor heat exchanger 16 in the power-saving defrosting mode becomes smaller than the enthalpy ΔHa, the defrosting time Tdef becomes longer than in the time-priority defrosting mode, but the integrated power consumption Ec of the compressor 11 can be made smaller than in the time-priority defrosting mode.

According to the refrigerating cycle apparatus 10 of the first embodiment, when defrosting the outdoor heat exchanger 16, the time-priority defrosting mode which gives priority to shortening the defrosting time Tdef, or the power-saving defrosting mode which gives priority to minimizing the integrated power consumption Ec of the compressor 11 can be appropriately selected based on whether the vehicle is running or not. Thus, the outdoor heat exchanger 16 can be defrosted in the suitable mode according to the situation.

As explained above, for example when frost is generated the outdoor heat exchanger 16 by a heating operation, the defrosting operation can be performed in order to defrost the outdoor heat exchanger 16 in the refrigerating cycle apparatus 10 of the first embodiment. When defrosting the outdoor heat exchanger 16, the air-conditioning control device 40 controls the valve travel of the first expansion valve 15a in the time-priority defrosting mode so that the low-pressure side refrigerant pressure Ps in the refrigerating cycle approaches the standard low-pressure side pressure KPs.

Thus, the refrigerating cycle apparatus 10 can secure the enthalpy ΔHa which can be used for defrosting, by controlling the valve travel of the first expansion valve 15a, and can maintain the temperature of the outdoor heat exchanger 16 to be more than or equal to the defrosting possible temperature. Thereby, the refrigerating cycle apparatus 10 can defrost the outdoor heat exchanger 16 in the mode which gives priority to shortening the defrosting time than the power-saving.

Moreover, the air-conditioning control device 40 controls the valve travel of the first expansion valve 15a so that the low-pressure side refrigerant pressure Ps detected by the low-pressure side pressure sensor 57, which is arranged at the inlet side of the compressor 11, approaches the standard low-pressure side pressure KPs corresponding to the first standard value Aa that is set for shortening the defrosting time Tdef, in the refrigerating cycle apparatus 10.

Since the low-pressure side refrigerant pressure Ps can be easily detected at high accuracy by the low-pressure side pressure sensor 57, the first expansion valve 15a can be controlled certainly at sufficient accuracy when defrosting the outdoor heat exchanger 16, and the defrosting time Tdef can be shortened.

The refrigerating cycle apparatus can defrost the outdoor heat exchanger 16 at the power-saving defrosting mode different from the time-priority defrosting mode. The valve travel of the first expansion valve 15a is controlled in the power-saving defrosting mode to a target value such as the second standard value Ab. As shown in FIG. 6, the second standard value Ab is determined such that the integrated power consumption Ec of the compressor 11 required for defrosting the outdoor heat exchanger 16 becomes the smallest.

Therefore, when the refrigerating cycle apparatus 10 performs the defrosting operation in the power-saving defrosting mode, the enthalpy required for defrosting the outdoor heat exchanger 16 can be secured, and the integrated power consumption Ec of the compressor 11 can be reduced.

Moreover, the refrigerating cycle apparatus 10 can defrost the outdoor heat exchanger 16 with two kinds of operation modes, such as the time-priority defrosting mode and the power-saving defrosting mode. The two modes can be used according to the environment of the vehicle having the outdoor heat exchanger 16 on which frost is generated.

According to the time-priority mode, the integrated power consumption Ec of the compressor 11 increases a little, but the defrosting of the outdoor heat exchanger 16 can be completed in a short time. On the other hand, according to the power-saving defrosting mode, the integrated power consumption Ec of the compressor 11 can be restricted from increasing, but the period of time taken for the defrosting becomes slightly longer. Namely, according to the refrigerating cycle apparatus 10, the time-priority defrosting mode or the power-saving defrosting mode can be selected appropriately to defrost the outdoor heat exchanger 16. Therefore, the advantages (such as a shortening in the defrosting time Tdef and a restricting the integrated power consumption Ec from increasing) of the two operation modes can fully be used.

In the refrigerating cycle apparatus 10, the time-priority defrosting mode or the power-saving defrosting mode is selected based on whether the vehicle including the air-conditioner 1 is running or not, to defrost the outdoor heat exchanger 16.

When the vehicle is running, the outdoor heat exchanger 16 is defrosted in the time-priority defrosting mode. When the vehicle is running, in consideration of the comfortableness in the vehicle interior, it is desirable to quickly complete the defrosting of the outdoor heat exchanger 16 to recover the heating performance. Therefore, the refrigerating cycle apparatus 10 can keep the vehicle interior comfortable for the occupant by recovering the heating performance quickly, when the vehicle is driving.

On the other hand, in a case where the vehicle stops without running, the demand to defrost the outdoor heat exchanger 16 with less integrated power consumption Ec becomes stronger than the demand for the early recovery of the heating operation. According to the refrigerating cycle apparatus 10, the outdoor heat exchanger 16 can be defrosted with little integrated power consumption Ec when the vehicle is not running.

(Second Embodiment)

Figure 10:
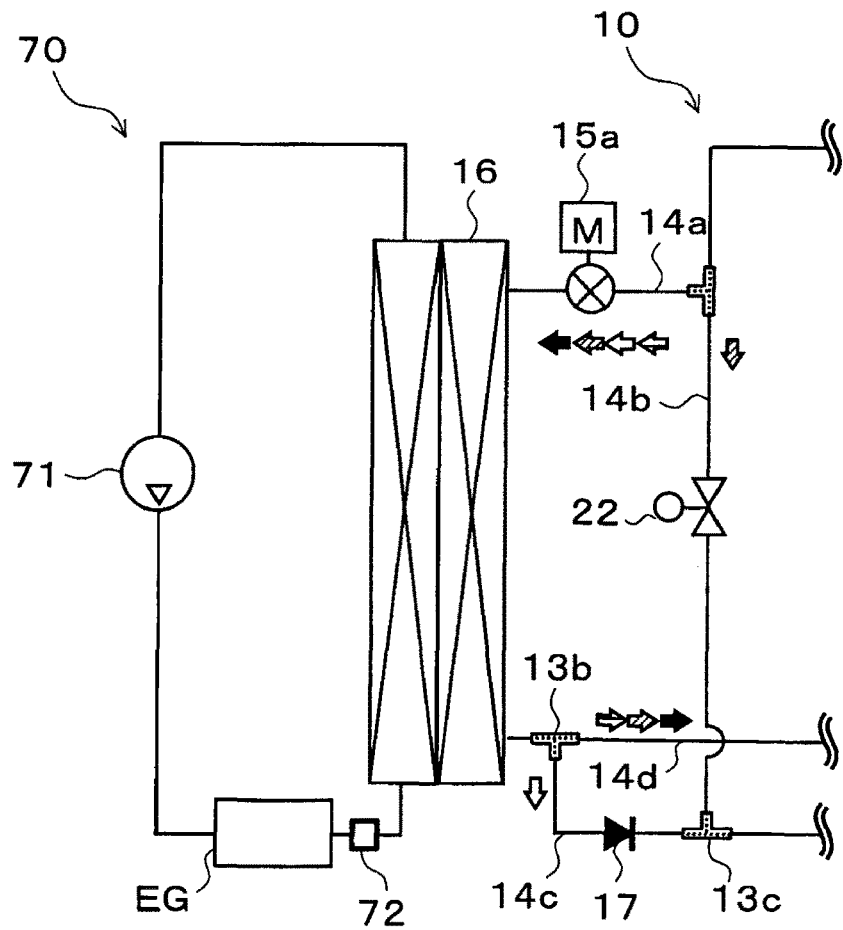
FIG. 10 is a schematic view illustrating a cooling-water circuit in an air-conditioner according to a second embodiment.
Figure 11:
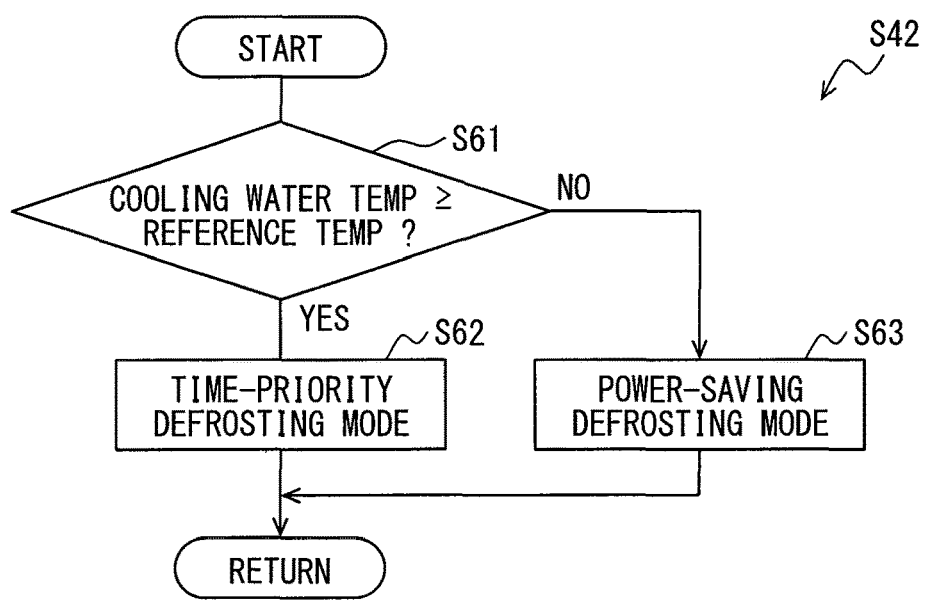
FIG. 11 is a flow chart of a subroutine to select a defrosting mode in a control processing of the air-conditioner of the second embodiment.

A second embodiment is described referring to FIG. 10 and FIG. 11. The air-conditioner 1 of the second embodiment has fundamentally the same configuration as the first embodiment except for a point where the air-conditioner 1 is applied to a vehicle which has an engine EG at least as a drive source.

In the second embodiment, the air-conditioner 1 has a cooling-water circuit 70. The subroutine performed at S42 of the second embodiment is different from the first embodiment when the defrosting mode is selected. The difference of the second embodiment from the first embodiment is explained referring to the drawings.

The air-conditioner 1 of the second embodiment has the refrigerating cycle apparatus 10, the indoor air-conditioning unit 30, the air-conditioning control device 40 in addition to the cooling-water circuit 70.

As shown in FIG. 10, the cooling-water circuit 70 has a cooling water pump 71, a water temperature sensor 72, the outdoor heat exchanger 16, and the engine EG. The cooling water pump 71 is an electromotive heat-medium pump which draws and discharges the cooling water. The engine EG is a drive source of the vehicle in which the air-conditioner 1 is disposed, and functions as an auxiliary heat source.

The cooling water pump 71 is driven to circulate the cooling water in the cooling-water circuit 70 including the engine EG and the outdoor heat exchanger 16 as a heat medium, and heat is exchanged in the engine EG and the outdoor heat exchanger 16. That is, exhaust heat of the engine EG is absorbed by the cooling water in the cooling-water circuit 70, and the heat can be radiated by the outdoor heat exchanger 16.

In the second embodiment, exhaust heat of the engine EG can be used for defrosting the outdoor heat exchanger 16 by driving the cooling water pump 71 of the cooling-water circuit 70 when defrosting the outdoor heat exchanger 16.

The water temperature sensor 72 is arranged in a range from the outlet port of the engine EG to the inflow port of the outdoor heat exchanger 16, and detects the temperature of the cooling water which circulates through the cooling-water circuit 70. The water temperature sensor 72 is connected to the input side of the air-conditioning control device 40 to presume the amount of heat absorbed by the cooling water from the engine EG. Furthermore, the water temperature sensor 72 can be used when presuming the amount of heat from the engine EG which can be used for defrosting the outdoor heat exchanger 16.

The cooling water in the cooling-water circuit 70 is a fluid as a heat medium. The cooling water may be a liquid including ethylene glycol, dimethyl polysiloxane, or nano fluid at least, or an antifreeze solution.

The operation of the air-conditioner 1 of the second embodiment is explained referring to the drawings. Like the first embodiment, the operation mode can be selected among the heating mode, the dehumidification heating mode, cooling mode, and the defrosting mode, by executing an air-conditioning control program by the air-conditioning control device 40.

The air-conditioning control program in the second embodiment is the same as that of the first embodiment fundamentally, and only the subroutine for choosing the operation mode at the defrosting mode is different. That is, the main routine shown in FIG. 3 and the subroutine to determine the operation mode shown in FIG. 4 are performed also in the second embodiment. The processing in FIG. 3 and FIG. 4 are the same as that of the first embodiment.

The subroutine performed at S42 in the second embodiment is explained referring to FIG. 11. When the subroutine S42 shown in FIG. 11 is started, it is determined whether the temperature of the cooling water detected by the water temperature sensor 72 is more than or equal to a predetermined reference temperature by referring to the detection signal inputted from the water temperature sensor 72 of the cooling-water circuit 70 at S61.

Here, the reference temperature represents the temperature of the cooling water in the state where the exhaust heat of the engine EG which can be used for defrosting the outdoor heat exchanger 16 was absorbed, and is suitably determined depending on the configurations of the outdoor heat exchanger 16 and the cooling water.

That is, at S61, it is determined whether it is possible to supply exhaust heat of the engine EG which is an auxiliary heat source for defrosting. When it is determined that the water temperature detected by the water temperature sensor 72 is more than or equal to the reference temperature, the control part progresses to S62. When it is determined that the water temperature is lower than the reference temperature, the control part progresses to S63.

At S62, the operation mode in the defrosting mode is determined as the time-priority defrosting mode. When the water temperature is more than or equal to the reference temperature, the exhaust heat of the engine EG can fully be utilized. The operation stop period of the heating mode can be further shortened by defrosting in the time-priority defrosting mode. After the time-priority defrosting mode is selected, the control part shifts to S5 in FIG. 3.

In S63, the operation mode in the defrosting mode is determined as the power-saving defrosting mode. When it is determined that the water temperature is lower than the reference temperature, the exhaust heat of the engine EG is not enough for defrosting the outdoor heat exchanger 16. In this case, although the defrosting time Tdef becomes long compared with the time-priority defrosting mode, the power-saving defrosting mode is set in order to reduce the integrated power consumption Ec of the compressor 11. After the power-saving defrosting mode is selected, the control part shifts to S5 in FIG. 3.

Thus, when defrosting the outdoor heat exchanger 16, the refrigerating cycle apparatus 10 of the second embodiment can select the time-priority defrosting mode or the power-saving defrosting mode, as two kinds of operation modes, according to whether the exhaust heat of the engine EG is supplied enough for defrosting. The outdoor heat exchanger 16 can be defrosted in the suitable mode according to the situation.

As explained above, according to the air-conditioner 1 of the second embodiment, defrosting operation can be performed in order to defrost the outdoor heat exchanger 16 when frost is generated by heating operation. When defrosting the outdoor heat exchanger 16, the air-conditioning control device 40 controls the valve travel of the first expansion valve 15*a* in the time-priority defrosting mode so that the low-pressure side refrigerant pressure Ps in the refrigerating cycle approaches the standard low-pressure side pressure KPs.

Thus, the refrigerating cycle apparatus 10 can secure the enthalpy ΔHa which can be used for defrosting, and can maintain the temperature of the outdoor heat exchanger 16 to be more than or equal to the defrosting possible temperature by controlling the valve travel of the first expansion valve 15*a*. Thereby, the refrigerating cycle apparatus 10 can defrost the outdoor heat exchanger 16 in the mode which gives priority to shortening the defrosting time than power-saving.

In this refrigerating cycle apparatus 10, the time-priority defrosting mode or the power-saving defrosting mode is chosen based on whether the water temperature of the cooling-water circuit 70 is more than or equal to the reference temperature.

When the water temperature is more than or equal to the reference temperature, the exhaust heat of the engine EG can be used enough for defrosting the outdoor heat exchanger 16, and the outdoor heat exchanger 16 is defrosted in the time-priority defrosting mode. In this case, since enough exhaust heat of the engine EG will be supplied to the outdoor heat exchanger 16, the defrosting time Tdef can be greatly shortened by defrosting the outdoor heat exchanger 16 with the time shortening defrosting mode. That is, since the heating performance of the air-conditioner 1 can be recovered quickly, the demand for the comfortableness in the vehicle interior can be met. On the other hand, when the water temperature is not more than the reference temperature, since the power-saving defrosting mode is chosen, the outdoor heat exchanger 16 can be defrosted with less integrated power consumption Ec.

(Other Embodiment)

The present disclosure is not limited to the embodiments mentioned above, and may be implemented with modifications within the scope not deviated from the present disclosure. It is also possible to combine suitably the embodiments.

In the embodiment, the low-pressure side refrigerant pressure Ps is detected at the inlet side of the compressor 11 by the low-pressure side pressure sensor 57 as physical quantity which has correlation with the refrigerant pressure in the evaporator. However, the physical quantity which has correlation with the refrigerant pressure in the evaporator is not limited to the low-pressure side refrigerant pressure Ps.

For example, the physical quantity which has correlation with the refrigerant pressure in the evaporator may be refrigerant temperature at the inlet side of the compressor. In this case, the defrosting standard value is also changed into a parameter corresponding to the refrigerant temperature at the inlet side of the compressor.

The refrigerating cycle apparatus 10 is not limited to be switched among the cooling operation, the heating operation, the dehumidification heating operation, and the defrosting operation, while the defrosting operation can be performed to circulate the refrigerant as hot gas at least to the heat exchanger (for example, outdoor heat exchanger 16) on which frost is generated.

The outdoor heat exchanger 16 and the indoor evaporator 18 are connected in parallel relative to a refrigerant flow in the refrigerating cycle in the dehumidification heating mode, but is not limited to this.

For example, it is possible to perform the dehumidification heating operation by circulating refrigerant in order of the compressor 11, the indoor condenser 12, the first expansion valve 15*a*, the outdoor heat exchanger 16, the second expansion valve 15*b*, the indoor evaporator 18, the evaporating pressure regulating valve 19, the accumulator 20 and the compressor 11. In this case, the outdoor heat exchanger 16 and the indoor evaporator 18 are connected in series relative to a refrigerant flow as the refrigerating cycle.

In the dehumidification heating mode, it is also possible to switch between the refrigerating cycle where the outdoor heat exchanger 16 and the indoor evaporator 18 are connected in parallel relative to a refrigerant flow, and the refrigerating cycle where the outdoor heat exchanger 16 and the indoor evaporator 18 are connected in series relative to a refrigerant flow.

At the defrosting operation, the cool-air bypass channel 35 is made full open by the air mixing door 34 to minimize the amount of heat exchange in the indoor condenser 12 so that the refrigerant as hot gas might flow into the outdoor heat exchanger 16, but is not limited to this.

For example, a channel change part may be provided to change the flow of refrigerant discharged from the compressor 11 among a bypass channel where the refrigerant bypasses the indoor condenser 12 and joins at the inflow port side of the first expansion valve 15a, a channel which flows into the indoor condenser 12, and a channel which flows into the first expansion valve 15a through the bypass channel.

According to this configuration, heat is not exchanged in the indoor condenser 12 by switching the flow of the refrigerant to flow the bypass channel at the defrosting operation. The outdoor heat exchanger 16 can be defrosted by making hot gas to flow into the outdoor heat exchanger 16.

The time-priority defrosting mode or the power-saving defrosting mode is selected based on whether the vehicle having the air-conditioner 1 is running, or whether the exhaust heat supplied from the engine EG as an auxiliary heat source exceeds the predetermined reference value, but is not limited to this.

For example, when the refrigerating cycle apparatus 10 is applied to a vehicle having a battery for driving the vehicle, the time-priority defrosting mode or the power-saving defrosting mode may be selected based on whether the electric power is supplied to the battery (for example, charging).

When electric power is supplied to the battery, the increase in the power consumption by defrosting the outdoor heat exchanger 16 does not so much affect the running of the vehicle. For this reason, the time-priority defrosting mode is chosen to quickly complete the defrosting of the outdoor heat exchanger 16 while the power consumption is large.

When electric power is not supplied to the battery, the increase in the power consumption by defrosting the outdoor heat exchanger 16 affects the running of the vehicle, so the power-saving defrosting mode is chosen to reduce the power consumption while the defrosting time Tdef increases.

The refrigerating cycle apparatus is applied to the air-conditioner 1, but is not limited to this. For example, the refrigerating cycle apparatus may be applied to a hot-water supply machine.

Such changes and modifications are to be understood as being within the scope of the present disclosure as defined by the appended claim.

What is claimed is:

1. A refrigerating cycle apparatus comprising:
a compressor that compresses and discharges refrigerant;
a radiator that makes the refrigerant discharged out of the compressor to radiate heat;
an expansion valve that decompresses the refrigerant flowing out of the radiator;
an evaporator that evaporates the refrigerant decompressed by the expansion valve;
a control device configured to control operation of the expansion valve;
the control device configured to determine whether a predetermined condition is satisfied for defrosting the evaporator; and
a mode controller that selects a time-priority defrosting mode or a power-saving defrosting mode based on a determination result of the control device, wherein
the control device controls the operation of the expansion valve in a manner that a physical quantity which has correlation with a pressure of the refrigerant in the evaporator approaches a predetermined defrosting standard value when the time-priority defrosting mode is set to shorten a period of time required for defrosting the evaporator,
the control device controls the operation of the expansion valve in a manner that an integrated power consumption of the compressor consumed during a defrosting operation becomes a minimum amount of integrated power consumed when the power-saving defrosting mode different from the time-priority defrosting mode is set,
the control device determines whether the vehicle is running with a speed more than or equal to a predetermined standard speed,
the mode controller selects the time-priority defrosting mode when it is determined that the vehicle is running with the speed more than or equal to the standard speed, and
the mode controller selects the power-saving defrosting mode when it is determined that the vehicle is not running with the speed more than or equal to the standard speed.

2. The refrigerating cycle apparatus according to claim 1, wherein
the physical quantity which has correlation with the pressure of the refrigerant in the evaporator is a pressure of the refrigerant at an inlet side of the compressor, and
the defrosting standard value is a predetermined refrigerant pressure.

3. A refrigerating cycle apparatus comprising:
a compressor that compresses and discharges refrigerant;
a radiator that makes the refrigerant discharged out of the compressor to radiate heat;
an expansion valve that decompresses the refrigerant flowing out of the radiator;
an evaporator that evaporates the refrigerant decompressed by the expansion valve;
a control device configured to control operation of the expansion valve;
the control device configured to determine whether a predetermined condition is satisfied for defrosting the evaporator; and
a mode controller that selects a time-priority defrosting mode or a power-saving defrosting mode based on a determination result of the control device, wherein
the control device controls the operation of the expansion valve in a manner that a physical quantity which has correlation with a pressure of the refrigerant in the evaporator approaches a predetermined defrosting standard value when the time-priority defrosting mode is set to shorten a period of time required for defrosting the evaporator,
the control device controls the operation of the expansion valve in a manner that an integrated power consumption of the compressor consumed during a defrosting operation becomes a minimum amount of integrated power consumed when the power-saving defrosting mode different from the time-priority defrosting mode is set,
the vehicle has an auxiliary heat source that outputs heat for defrosting the evaporator,
the control device determines whether the amount of heat supplied from the auxiliary heat source is more than or equal to a predetermined heat amount value,
the mode controller selects the time-priority defrosting mode when it is determined that the amount of heat supplied from the auxiliary heat source is more than or equal to the predetermined heat amount value, and the mode controller selects the power-saving defrosting mode when it is determined that the amount of heat supplied from the auxiliary heat source is not more than or equal to the predetermined heat amount value.

4. The refrigerating cycle apparatus according to claim 3, wherein the physical quantity which has correlation with the pressure of the refrigerant in the evaporator is a pressure of the refrigerant at an inlet side of the compressor, and the defrosting standard value is a predetermined refrigerant pressure.

* * * * *